United States Patent [19]
Sakashita et al.

[11] Patent Number: 5,677,587
[45] Date of Patent: Oct. 14, 1997

[54] SMALL MOTOR HAVING DRIVE MAGNET WITH MAGNETIZATION PATTERN FOR BIASING ROTOR SHAFT

[75] Inventors: Hiroshi Sakashita; Jun Yamashita, both of Nagano, Japan

[73] Assignee: Kabushiki Kaisha Sankyo Seiki Seisakusho, Nagano, Japan

[21] Appl. No.: 183,370

[22] Filed: Jan. 19, 1994

[30] Foreign Application Priority Data

Jan. 19, 1993 [JP] Japan ................... 5-004071 U
Aug. 6, 1993 [JP] Japan ................... 5-215256
Oct. 12, 1993 [JP] Japan ................... 5-280059

[51] Int. Cl.$^6$ ........................... H02K 21/26; H02K 21/38
[52] U.S. Cl. ........................ 310/154; 310/156; 310/269; 310/254; 310/258; 310/259; 310/261
[58] Field of Search ........................ 310/156, 269, 310/254, 258, 259, 261, 154

[56] References Cited

U.S. PATENT DOCUMENTS

| | | | |
|---|---|---|---|
| 5,083,054 | 1/1992 | Tomite et al. | 310/154 |
| 5,089,737 | 2/1992 | Abukawa et al. | 310/154 |
| 5,109,172 | 4/1992 | Pace | 310/154 |
| 5,162,684 | 11/1992 | Hayakawa | 310/154 |
| 5,206,556 | 4/1993 | Hayakawa | 310/154 |
| 5,349,258 | 9/1994 | Leupold et al. | 310/154 |

*Primary Examiner*—Steven L. Stephan
*Assistant Examiner*—Elvin G. Enad
*Attorney, Agent, or Firm*—Sughrue, Mion, Zinn, Macpeak & Seas, PLLC

[57] ABSTRACT

A small motor includes a rotor fastened to a rotor shaft; a drive magnet disposed facing to the rotor; and bearings for rotatably supporting the rotor shaft with the rotor fastened thereto, wherein a magnetization pattern of the magnet is shaped in such a manner that magnetic forces contributing to the rotation drive of the rotor are balanced, and magnetic forces contributing to the rotor core attraction are unbalanced, thereby biasing the rotor shaft in fixed directions within the bearings.

19 Claims, 17 Drawing Sheets

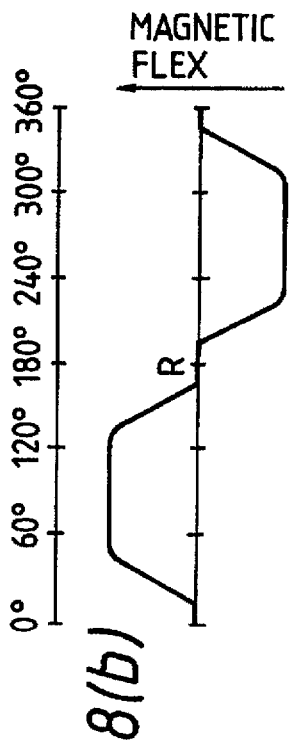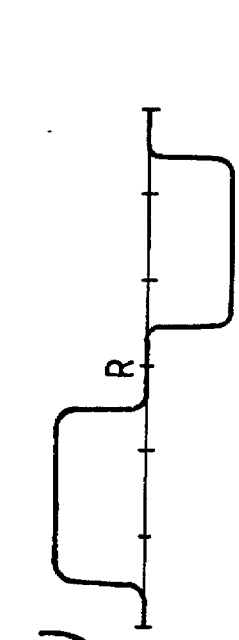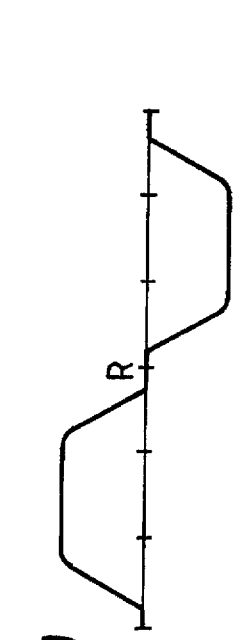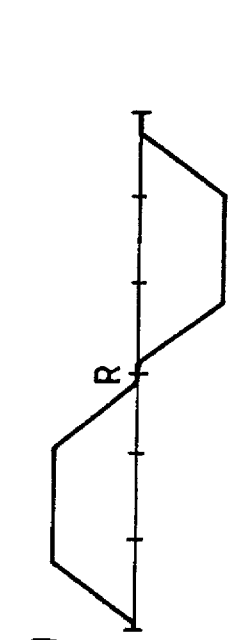
FIG. 8(b)   FIG. 8(d)   FIG. 8(f)   FIG. 8(h)
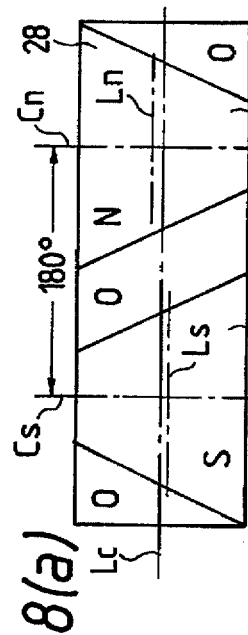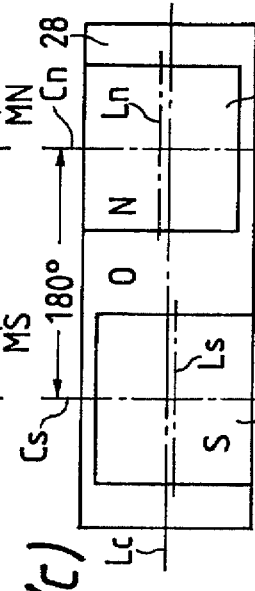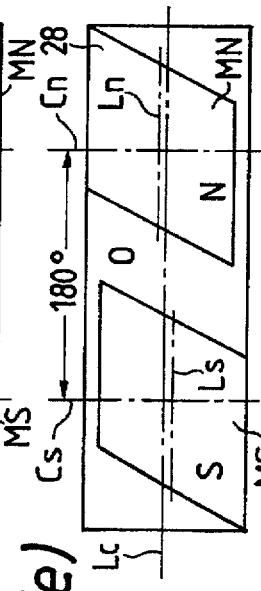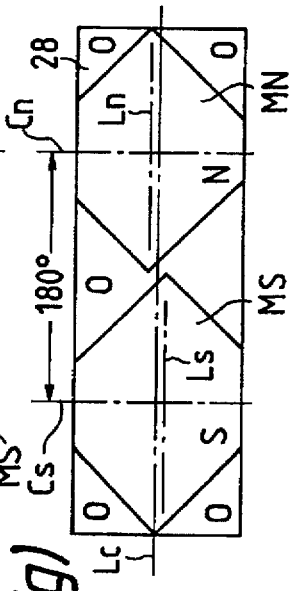
FIG. 8(a)   FIG. 8(c)   FIG. 8(e)   FIG. 8(g)

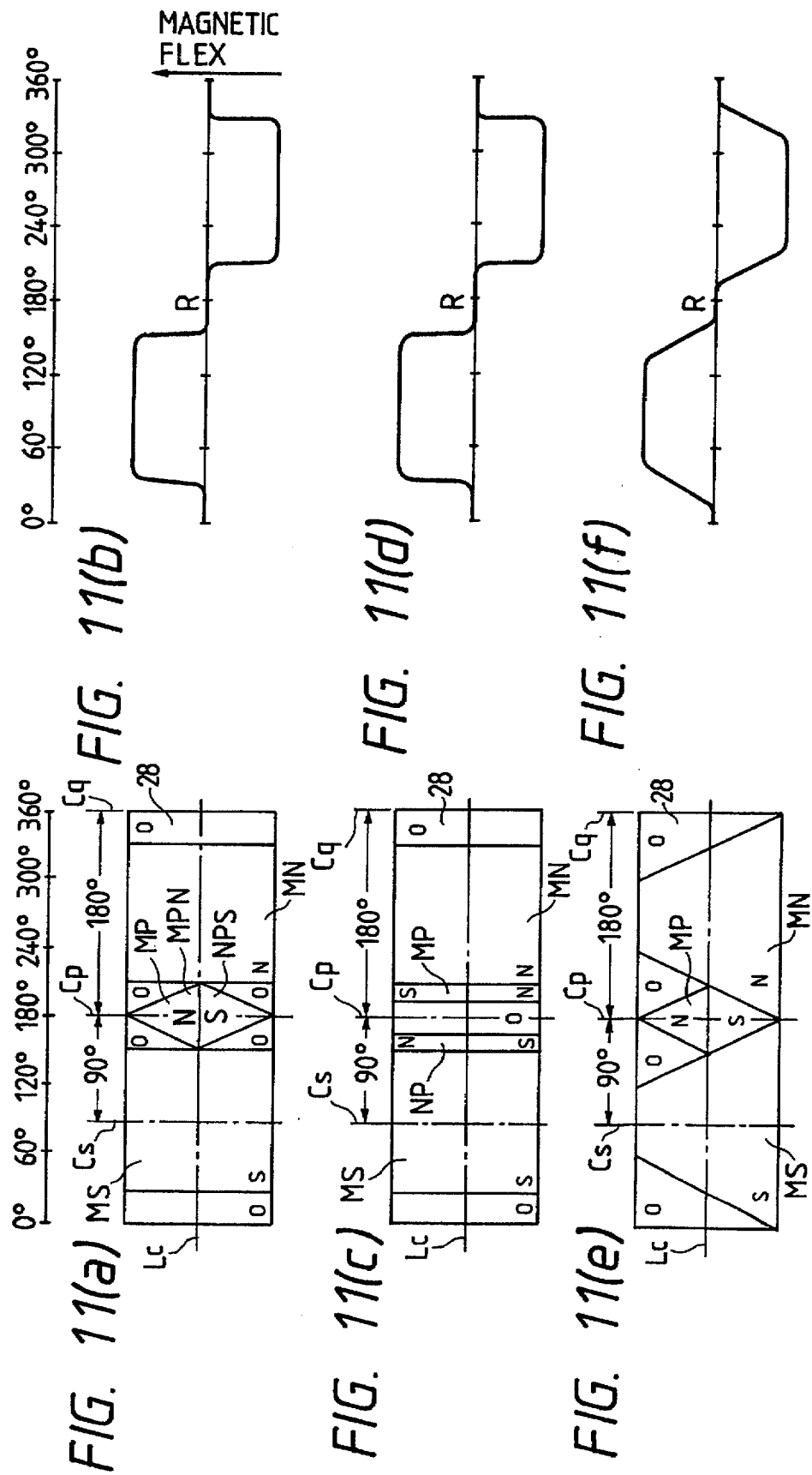

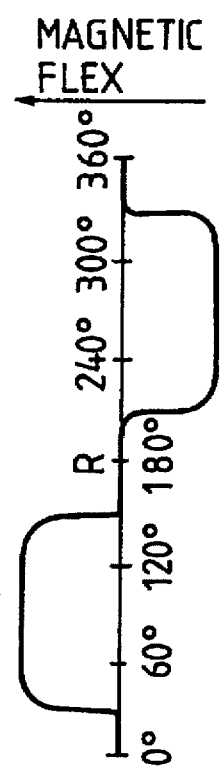
FIG. 15(b)
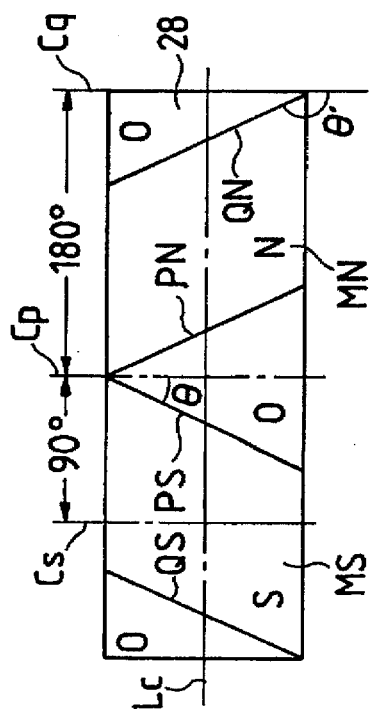
FIG. 15(a)
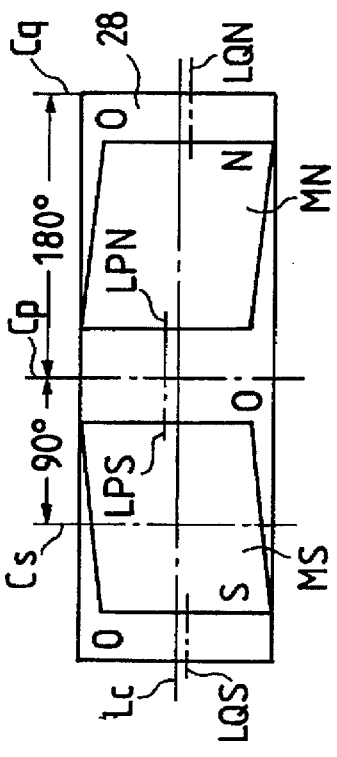
FIG. 16(b) / FIG. 16(a)

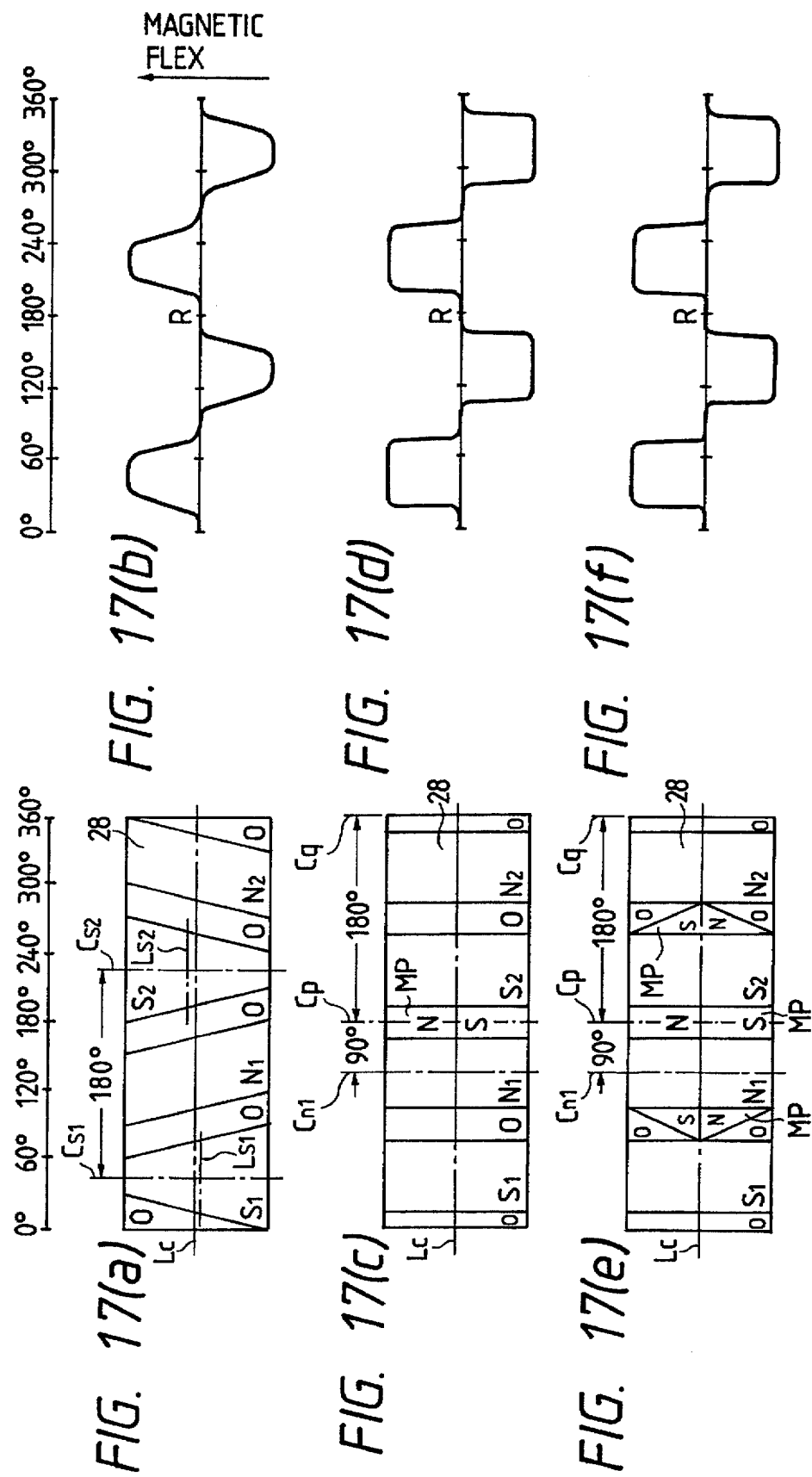

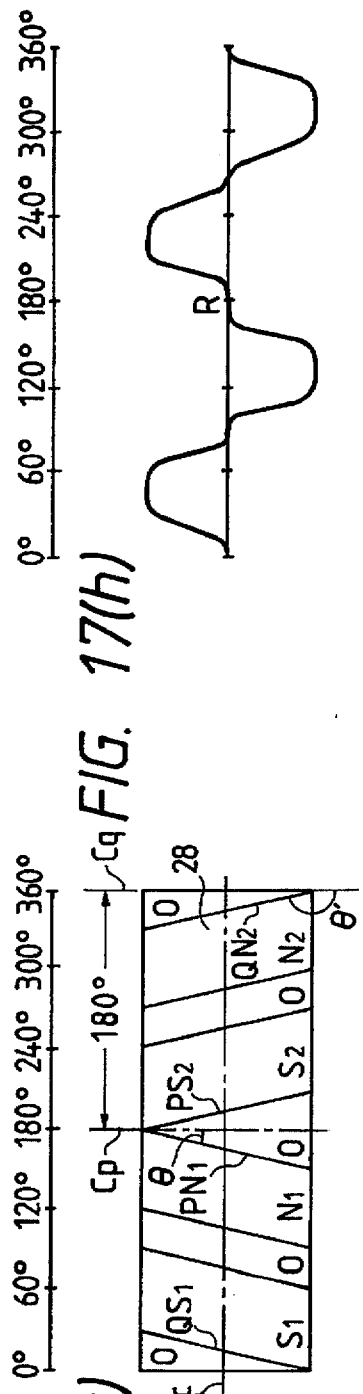
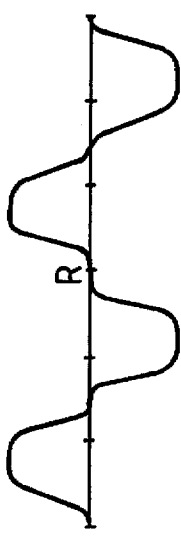
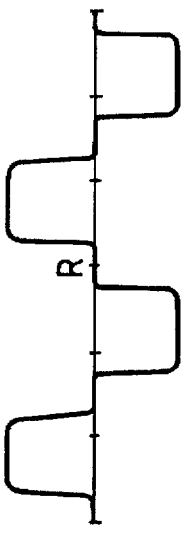
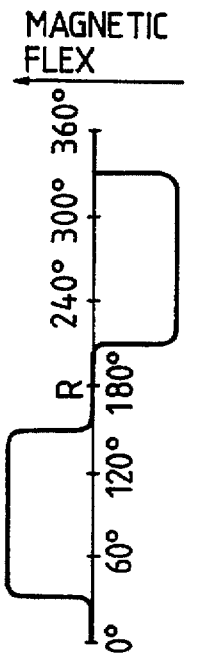
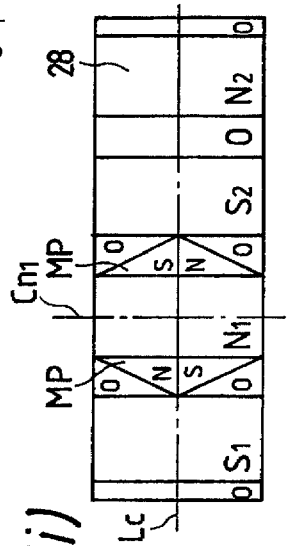
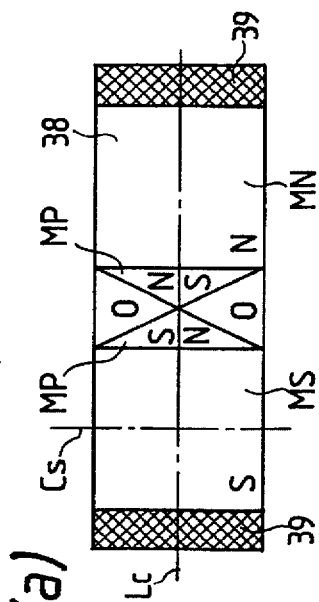
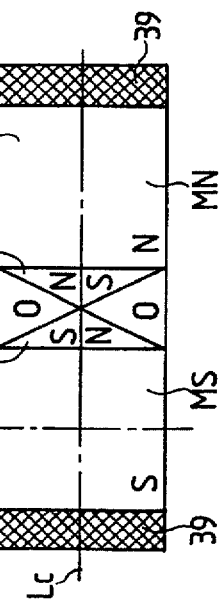
FIG. 17(g)   FIG. 17(h)
FIG. 17(i)   FIG. 17(j)
FIG. 18(a)   FIG. 18(b)

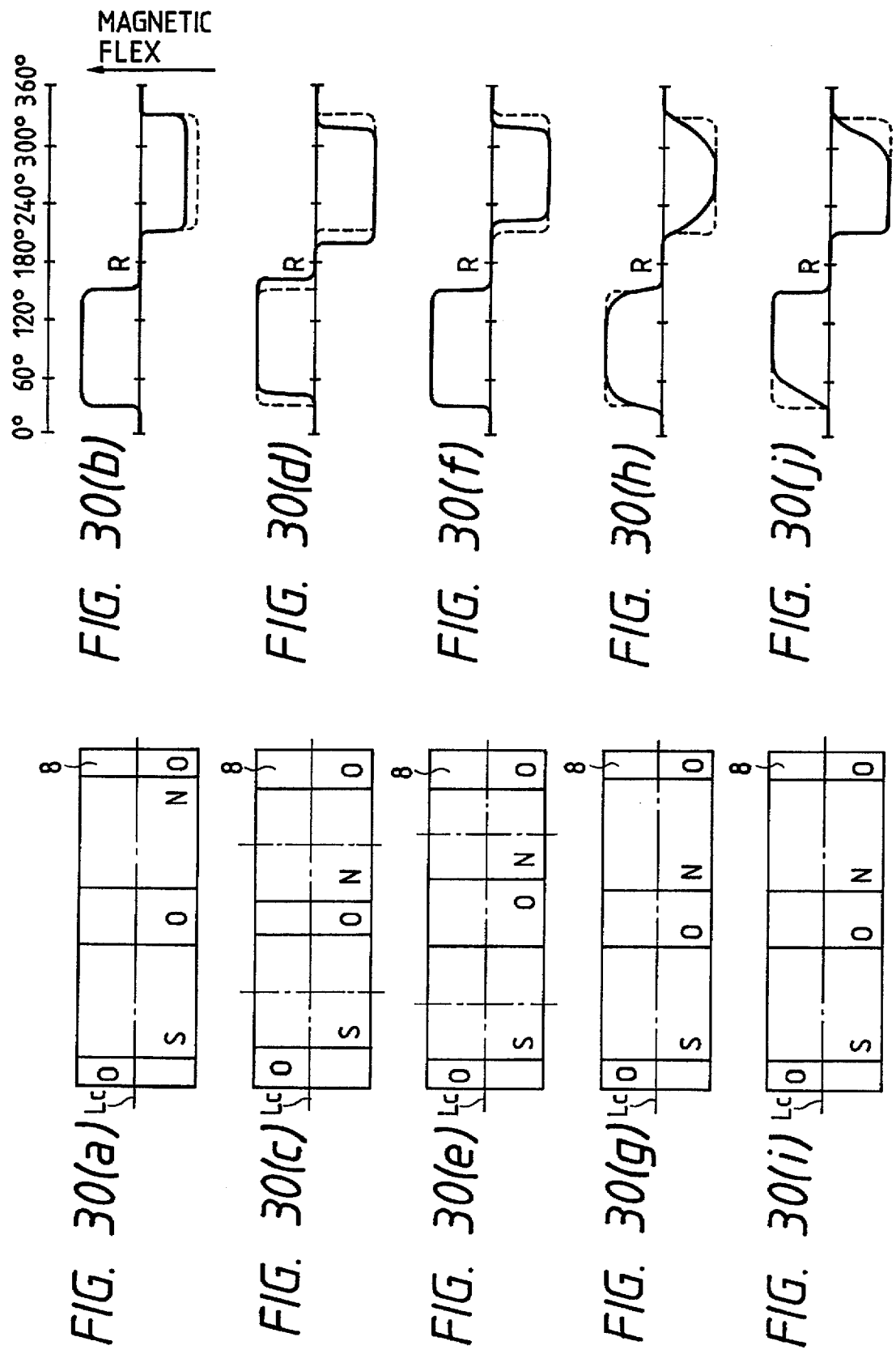

SMALL MOTOR HAVING DRIVE MAGNET WITH MAGNETIZATION PATTERN FOR BIASING ROTOR SHAFT

BACKGROUND OF THE INVENTION

1. Field of the Invention

The present invention relates to a noiseless small motor free from a swing-turn caused by a play of the rotor shaft.

2. Related Art

FIGS. 26 and 27 cooperate to show the structure of a general small motor with a core, most popularly used. As shown, an end plate 2 is fastened to an open end of a cup-shaped motor case 1. Sintered oil-contained bearings 3 and 3, formed by a contraction working process, are press fit into the central part of the bottom of the motor case 1 and the center of the end plate 2. A rotor shaft 4 is rotatably supported by the couple of bearings 3 and 3. The center hole of a rotor core 5 is fit to the rotor shaft 4 within the motor case 1. The rotor core 5 is provided with a proper number (three in the instance of FIG. 3) of protrusion poles each having a drive coil 6 put thereon. A ring-shaped drive magnet 8 is fastened on the inner surface of the motor case 1. The inner surface of the drive magnet 8 confronts with the outer surface of the rotor core 5, with a gap therebetween. The rotor core 5 and the drive coil 6 make up a rotor 10. Current is fed to the drive coil 6 by way of a commutator 7 and a brush 9, both assembled for the rotor shaft 4. With an angular position of the rotor 10, the current is switched to cause a continuous turn of the rotor 10.

In the small motor thus constructed, in order to obtain an easy assembly and to prevent a seizure of the bearings 3 and the rotor shaft 4, it is necessary to provide a clearance 11 between the bearings 3 and the rotor shaft 4, as shown in FIG. 28. In FIG. 28, the clearance 11 is exaggeratedly illustrated. With provision of the bearings 3 and the rotor shaft 4, the rotor 10 vibrates within the clearance 11 by an attraction force by a field magnet, so that the rotor shaft 4 hits the bearings 3 to generate noise. Further, the rotor shaft 4 turns while swinging so as to depict a trace of a conical shape, as shown in FIG. 29 (This motion will be called a swing-turn). When the motor thus constructed is applied for a spindle motor in a disk drive device, a readout error tends to occur in reading out data signal because of the vibration and the swing-turn. When it is applied for a sound system, the wow and flutter performance is deteriorated.

There are proposals to eliminate the vibration and swing-turn inherent to the small motor. Exemplars of these prior techniques are Published Unexamined Japanese Utility Model Application Nos. Sho. 62-115765 and Hei. 1-113558. In these techniques, the rotor shaft is biased in a fixed direction within the bearings by reforming the field magnet for the rotor core. To this end, the center of the rotor is deviated. The thickness of the drive magnet is continuously varied. The gap between the rotor core and the magnet is intentionally made nonuniform. A plurality of magnets shaped like a C in cross section are arranged at nonuniform spacial intervals or magnetized nonuniformly. A plurality of magnets, shaped like a U in cross section, of different materials are used. Those U-shaped magnets are physically deformed by forming holes, cut-out parts, hollows or indentations, or the like in the magnets.

The small motor has the following problems.

1) The gap between the magnets and the rotor core increases. The magnetic neutral point is displaced. Non saturation magnetization takes place. The result is reduction of the developed torque.

2) Where the magnets are physically deformed by hollows, cut-out, hollows or the like, care must be taken for the orientations of the magnets in the assembling stage. This leads to increase of cost.

3) Where the magnets used have different thickness, width, length, and the eccentricity of the inner diameter of the magnets, an increased number of type of parts must be used.

4) Where the magnets fixed at different positions as viewed in the thrust direction are used, special means and steps are required.

5) Where the magnetic unbalance is employed, an irregular motor speed, and increase of torque ripple and cogging torque inevitably occur.

FIGS. 30(a) to (j) show relationships of the constructions of the conventional small motors, and torque reduction, irregular motor speed, torque ripple increase, and cogging torque increase. In the figure, N and S indicate magnetic poles, O indicates nonmagnetized portions, and Lc indicates the magnetic center of the core located in opposition to the magnets when viewed in the thrust direction. In a set of diagrams FIGS. (a) and (b) disclosed in Published Unexamined Japanese Utility Model Application No. Sho. 62-115765, the gap between the rotor core and the magnets or the magnetized portions are varied. Accordingly, the magnetic flux and hence the resultant torque varies, so that the motor rotates at irregular speeds. In another set of diagrams FIGS. 30(c) and (d) also shown in the above publication, the nonmagnetized portions have different width values. In this construction, the magnetizing position is deviated from the position providing a maximum performance. The construction suffers from increase of cogging torque and torque loss. In yet another set of diagrams FIG. 30(e) and (f) shown in the same publication, the magnets are different in the width. The torque loss and cogging torque take place at the narrow magnets. A set of diagrams FIGS. (g) and (h) is shown in FIG. 2 in Published Unexamined Japanese Utility Model Application No. Hei. 1-113558. As shown, the gap between the magnets and the core are continuously varied. In this construction, the distribution of the magnetic flux density varies with the magnets, so that the torque ripple increases. An additional set of diagrams FIGS. 30(i) and (j) is shown in the same publication. In this construction, the air gap is continuously varied by continuously varying the thickness of the magnets. This construction suffers from increase of the cogging torque.

SUMMARY OF THE INVENTION

With the view of overcoming the disadvantages of the prior techniques, the present invention has an object to provide a small motor which is free from torque loss, irregular motor speed, and increase of the torque ripple and cogging torque, with such a construction that the field magnet to the rotor core is put to an unbalanced state so as to bias the rotor shaft in a fixed direction.

According to an aspect of the present invention, there is provided a small motor comprising a rotor fastened to a rotor shaft; a drive magnet disposed facing to the rotor; and bearings for rotatably supporting the rotor shaft with the rotor fastened thereto, wherein a magnetization pattern of the magnet is shaped in such a manner that magnetic forces contributing to the rotation drive of the rotor are balanced, and magnetic forces contributing to the rotor core attraction are unbalanced, thereby biasing the rotor shaft in fixed directions within the bearings.

According to an aspect of the present invention, there is provided a small motor comprising a shaft; a stator; a rotor rotatably confronted to the stator; and bearings for rotatably supporting the shaft, wherein one of rotor and the stator is formed by core winding a wire and the other is formed by a magnet, wherein the central angles of one of the drive magnetized portions formed in the magnet in the condition of the thrust center corresponding to the magnetic central position in an axis direction of the core are different from each other at positions on both sides of the thrust center.

According to the present invention, a magnetization pattern of the magnet disposed facing the rotor core is so shaped that the magnetic forces contributing to the rotation drive of the rotor are balanced. The resultant motor suffers from less torque loss, little cogging torque, little torque ripple, and less motor speed irregularity. Further, the magnetization pattern is so shaped that the magnetic forces contributing to the rotor core attraction are unbalanced, thereby biasing the rotor shaft in fixed directions within the bearings. There is eliminated a play of the rotor shaft. Accordingly, the motor shaft steadily rotates without generating noise and the swing turn.

According to the present invention, the magnetic unbalance as viewed in the thrust direction causes an attraction force acting in the axial direction, which pushes the rotor in the thrust direction. As a result, a vibration of the rotor in the axial direction is eliminated. The magnet and the core are not deformed in any form for obtaining the attraction force in the axial direction. This feature neither increases the part cost nor decreases the motor torque. The vibration of the rotor in the axial direction is controlled by using a unique magnetization pattern of one magnet. With this feature, a small motor can be realized without increasing the number of parts and the cost to manufacture.

Additionally, the vibration of the rotor in the axial direction can be controlled to a minimum without increasing the axial length of the small motor when compared with a case where the rotor is pushed in the axial direction by an attraction force acting in the axial direction that is caused by deviating the center of the axial length of the core from that of the axial length of the magnet.

Further, the magnetic forces to attract the core in the radial direction are unbalanced to bias the rotor shaft in a fixed direction within the bearing. This feature eliminates the vibration of the rotor shaft within the bearing, and the swing turn of the rotor shaft.

Additionally, the magnetization pattern of the magnet facing the core is shaped so as to balance the magnetic forces contributing to the rotation drive of the rotor. Therefore, the torque loss, cogging torque and torque ripple are minimized, ensuring a smooth turn of the motor. The irregular motor speed is also removed.

DETAILED DESCRIPTION OF THE DRAWINGS

Figure 4:
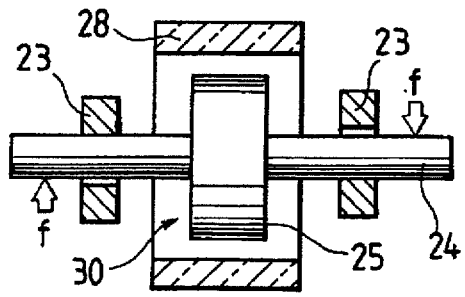
Figure 6:
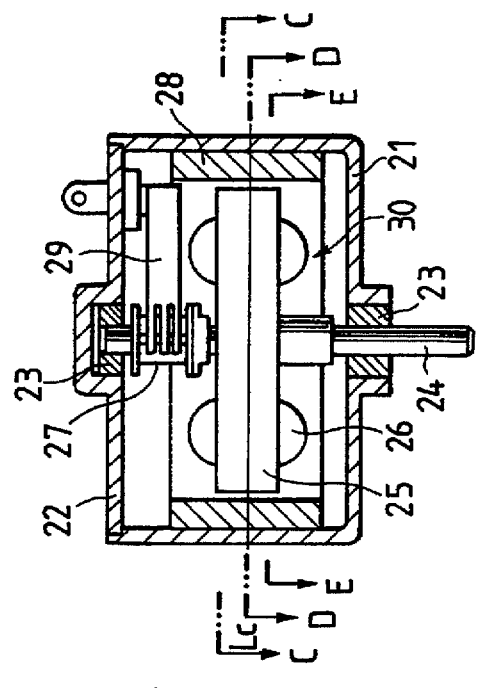

FIGS. 3($a$) and ($b$) show a development diagram of a magnet and a diagram showing a magnetic flux density distribution, respectively;

FIG. 4 is a vertical sectional view of the motor useful in explaining a radial force acting on the rotor shaft;

FIGS. 5($a$) to ($d$) show perspective views showing some typical examples of forces acting in the radial direction;

FIG. 6 is a vertical sectional view showing a small motor according to a second embodiment of the present invention.

Figure 7C:
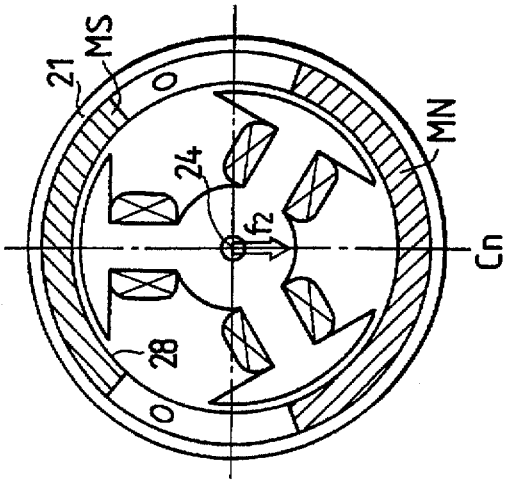
Figure 7B:
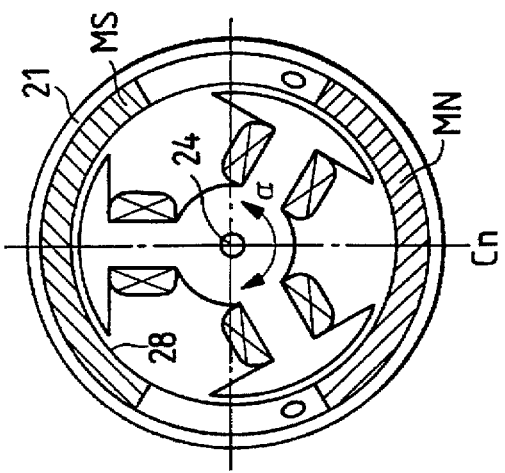
Figure 7A:
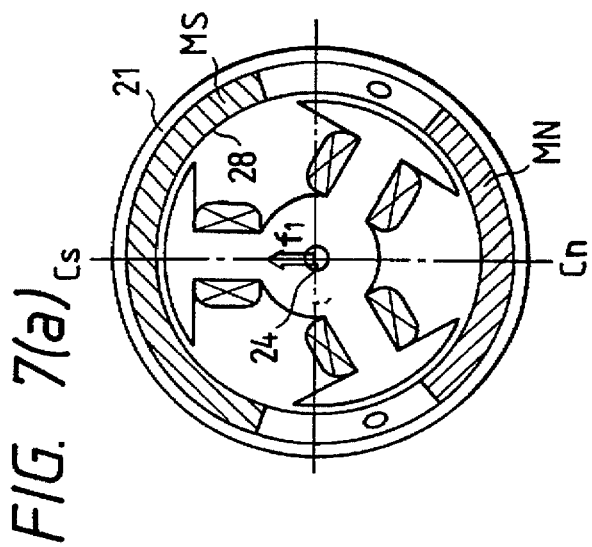
Figure 9:
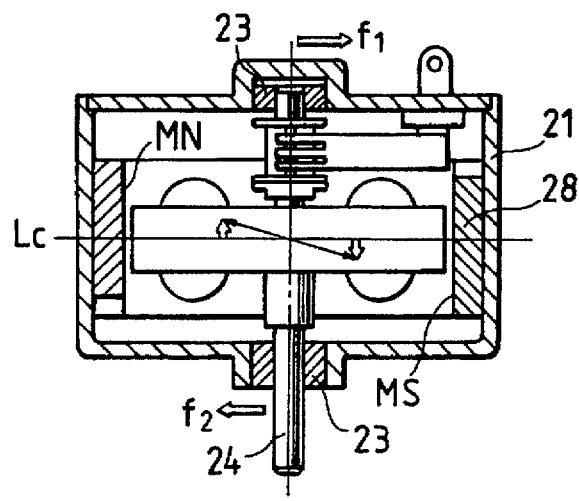

FIGS. 7($a$) to ($c$) are cross sectional views taken on lines C—C, D—D, and E—E in FIG. 6;

FIGS. 8($a$) to ($h$) show development diagrams of the magnet in the second embodiment and some modifications of the magnet, and diagrams showing magnetic flux distributions associated with the magnets;

FIG. 9 is a vertical sectional view showing the small motor of FIG. 6.

Figure 10:
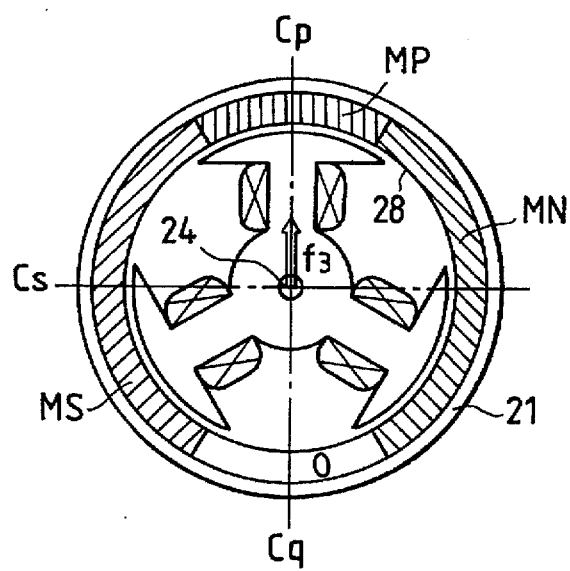
Figure 12:
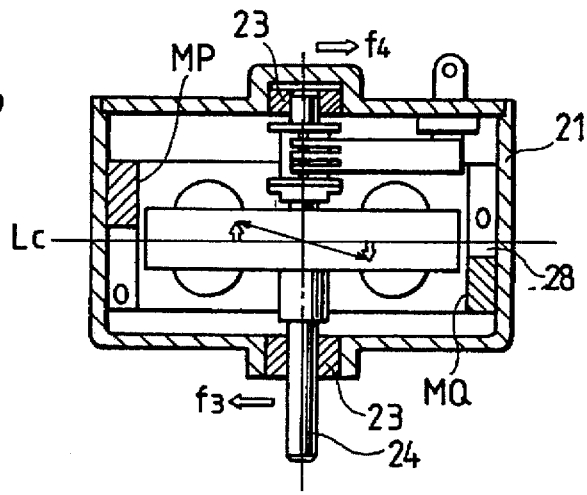
Figure 13A:
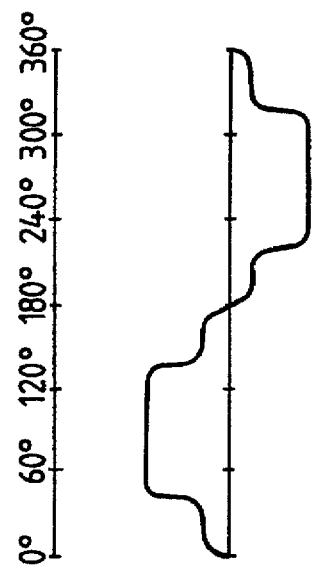
Figure 19:
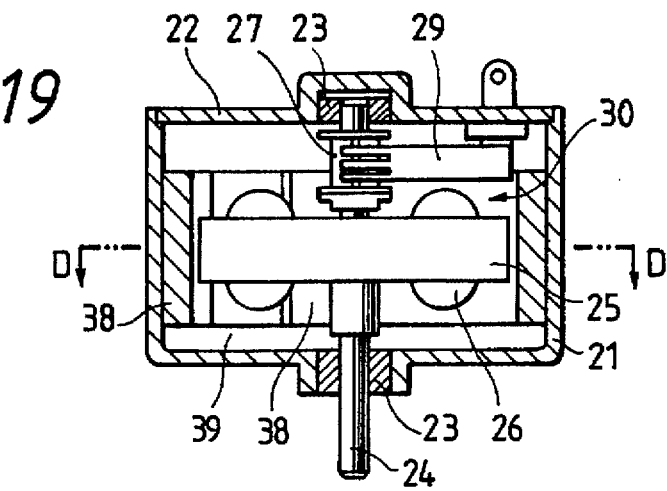
Figure 20:
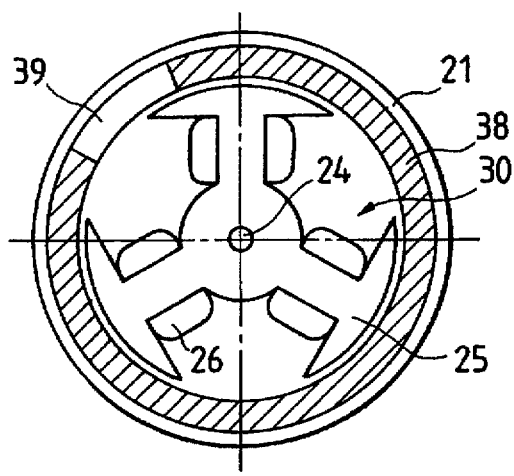
Figure 21:
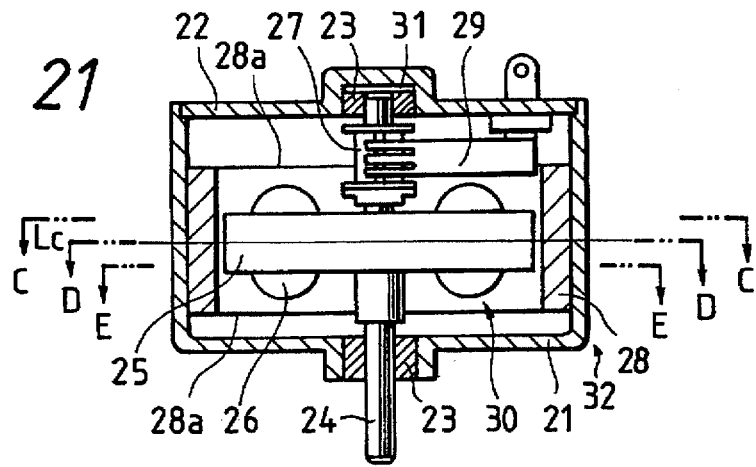
Figure 24:
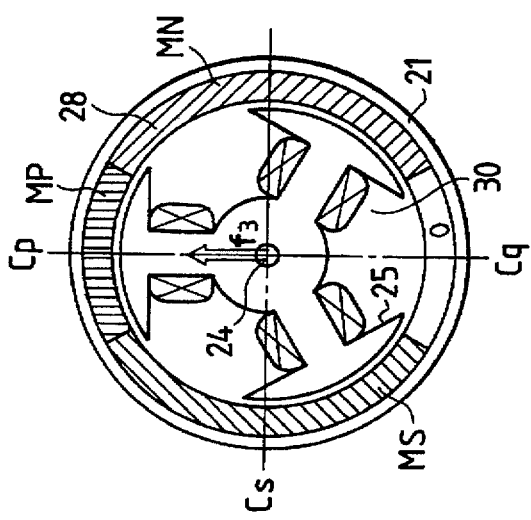
Figure 25:
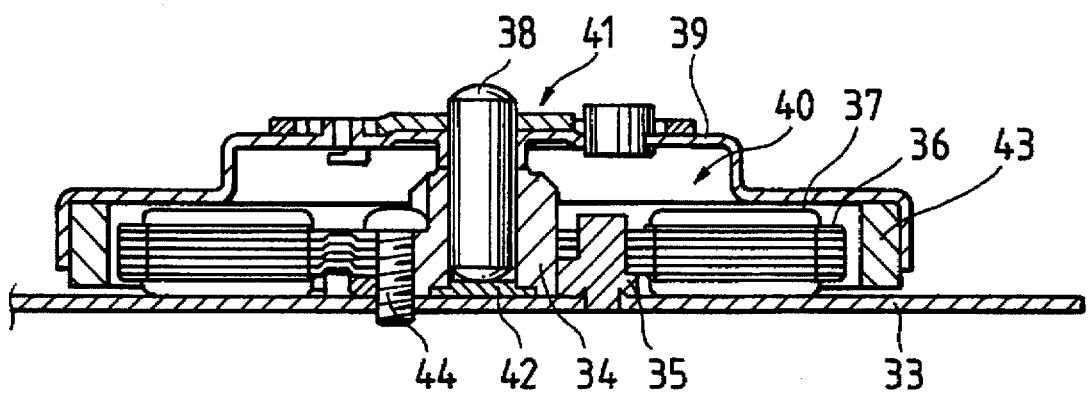
Figure 26:
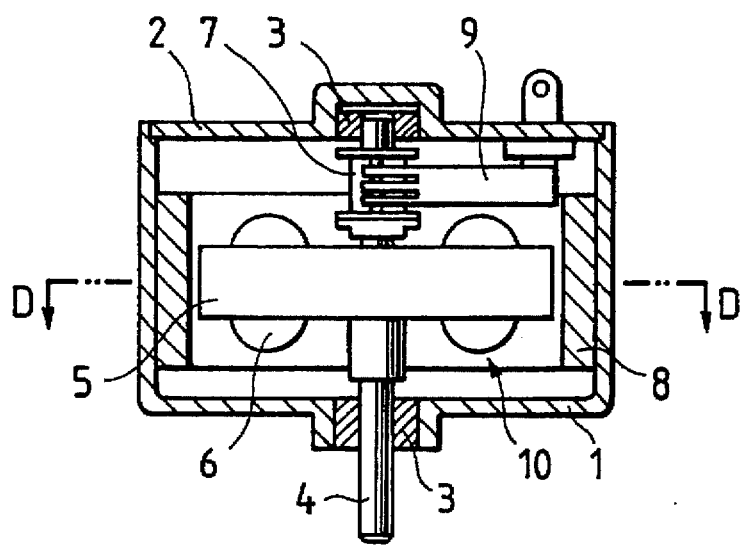
Figure 27:
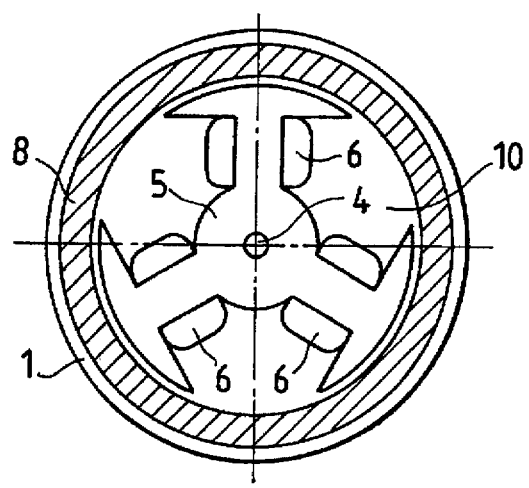
Figure 28:
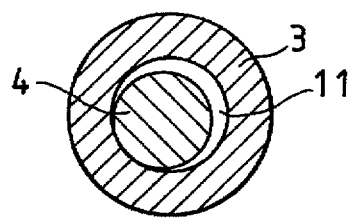
Figure 29:
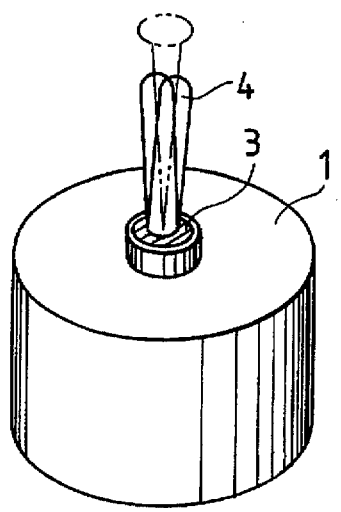

FIG. 10 is a traverse cross sectional view showing a small motor according to a third embodiment of the present invention;

FIGS. 11($a$) to ($f$) show development diagrams of the magnet in the third embodiment and some modifications of the magnet, and diagrams showing magnetic flux distributions associated with the magnets;

FIG. 12 is a vertical sectional view showing a small motor according to a fourth embodiment of the present invention;

FIGS. 13($a$) and ($b$) show a development diagram of a drive magnet of the motor and a magnetic flux density distribution profile associated with the drive magnet, respectively;

FIGS. 14($a$) to ($c$) show cross sectional views of a small motor according to a fifth embodiment of the present invention in different positions of the motor;

FIGS. 15($a$) and ($b$) show a development diagram of a drive magnet of the motor and a magnetic flux density distribution profile associated with the drive magnet;

FIGS. 16($a$) and ($b$) show a development diagram of a drive magnet of a small motor according to a sixth embodiment of the present invention, and a magnetic flux density distribution profile associated with the drive magnet;

FIGS. 17($a$) to ($j$) show development diagrams of several types of drive magnets showing some modifications of the embodiments of the present invention, and magnetic flux density distribution profile associated with the drive magnet;

FIGS. 18($a$) and ($b$) show a development diagram of a drive magnet of a small motor according to still another embodiment of the present invention, and a magnetic flux density distribution profile associated with the drive magnet;

FIG. 19 shows a vertical sectional view of the small motor using the drive magnet of FIG. 18;

FIG. 20 shows a traverse cross sectional view of the same small motor using the drive magnet of FIG. 18;

FIG. 21 shows a cross sectional view showing a small motor according to a seventh embodiment of the present invention;

FIGS. 22($a$) to ($c$) show traverse sectional views taken along lines C—C, D—D and E—E in FIG. 21;

FIGS. 23($a$) to ($j$) show development diagrams of the magnet in the seventh to eleventh embodiment, and diagrams showing magnetic flux distributions associated with the magnets;

FIG. 24 shows a traverse sectional view of another embodiment of a small motor according to the present invention;

FIG. 25 shows a cross sectional view of another embodiment of the present invention;

FIG. 26 is a vertical sectional view showing a conventional small motor;

FIG. 27 is a traverse cross sectional view taken along line D—D in FIG. 26;

FIG. 28 is a cross sectional view showing a relationship between a rotor shaft and a bearing in the small motor;

FIG. 29 is a perspective view showing a swing-turn of the rotor shaft in the small motor; and FIGS. 30(a) and (j) development diagrams showing different types of magnets of conventional small motors and diagrams showing magnetic flux distributions associated with the magnets.

DETAILED DESCRIPTION OF THE PREFERRED EMBODIMENTS

Before proceeding with the description of the preferred embodiments of the present invention, the direction of a force acting to bias the rotor shaft in a fixed direction within the bearings will be described. Reference is made to FIG. 4. In the figure, a rotor shaft 24 is supported at both ends by bearings 23 and 23. The rotor shaft 24 and a rotor core 25 fastened to the rotor shaft 24 make up a rotor 30. The rotor core 25 is surrounded by a drive magnet 28 in a state that the outer surface of the rotor core 25 faces the inner surface of the drive magnet 28, with a gap therebetween. A force f acts on the rotor shaft 24 in the radial direction in order to prevent the vibration and the swing-turn of the rotor shaft 24 within the bearings 23 and 23.

As seen from FIG. 28, in the magnet 28 main magnetic poles are alternately arrayed in the circumferential direction. The forces acting the rotor shaft 24 in the radial direction are selectively defined for angles with respect to the main magnetic pole as follows:

f1: force acting in the center direction of the central angle of one main magnetic pole f2: force acting in the direction 180° turned from the force f1 f3: force acting in the direction 90° of an electrical angle turned from the center direction of the central angle of one main magnetic pole f4: force acting in the direction 180° turned from the force f3

The means for biasing the rotor shaft 24 using the forces f1 to f4 may come in four varieties of FIGS. 5(a) to 5(d).

a) The force f1 acts on both ends of the rotor shaft 24 respectively supported by the bearings 23.

b) The force f1 acts on one end of the rotor shaft 24 while the force f2 acts on the other end.

c) The force f3 acts on both ends of the rotor shaft 24.

d) The force f3 acts on one end of the rotor shaft 24 while the force f4 acts on the other end.

Some specific embodiments of a small motor, rotor shaft biased, according to the present invention will be described in detail.

First Embodiment

Figure 2:
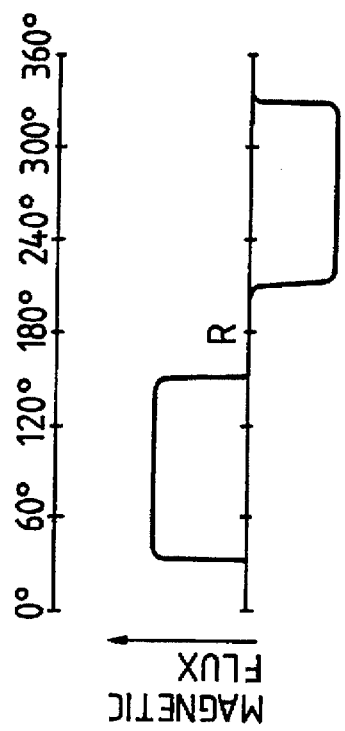
FIG. 2 is a cross sectional view taken on line A—A in FIG. 1.
Figure 1:
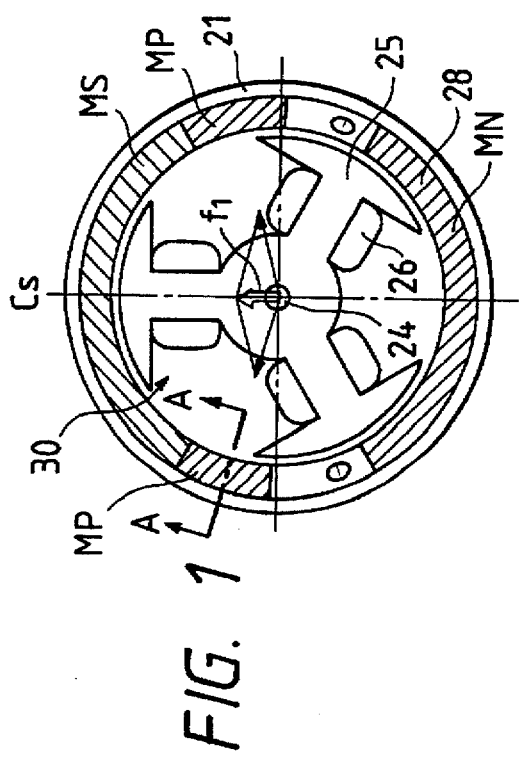
FIG. 1 is a cross sectional view showing a first embodiment of a small motor according to the present invention.

FIGS. 1 through 3 cooperate to show the structure of a small motor constructed according to the present invention. As shown, an end plate 22, as in the prior motor already described, is fastened to an open end of a cup-shaped motor case 21. Sintered oil-contained bearings are press fit into the central part of the bottom of the motor case 21 and the center of the end plate 22. A rotor shaft 24 is rotatably supported by the couple of bearings, not shown. The center hole of a rotor core 25 is fit to the rotor shaft 24 within the motor case 1. The rotor core 25 is provided with a proper number (three in the instance of the figures) of protrusion poles each having a drive coil 26 put thereon. A ring-shaped drive magnet 28 is fastened on the inner surface of the motor case 21. The inner surface of the drive magnet 28 confronts with the outer surface of a rotor core 25, with a gap therebetween. The rotor core 25 and the drive coil 26 make up a rotor 30. Current is fed to the drive coil 26 by way of a commutator and a brush, both not shown. With an angular position of the rotor 30, the current is switched to cause a continuous turn of the rotor 30.

Figure 3B:
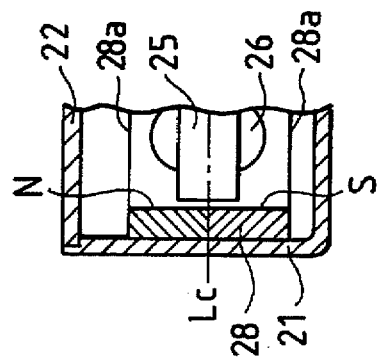
Figure 3A:
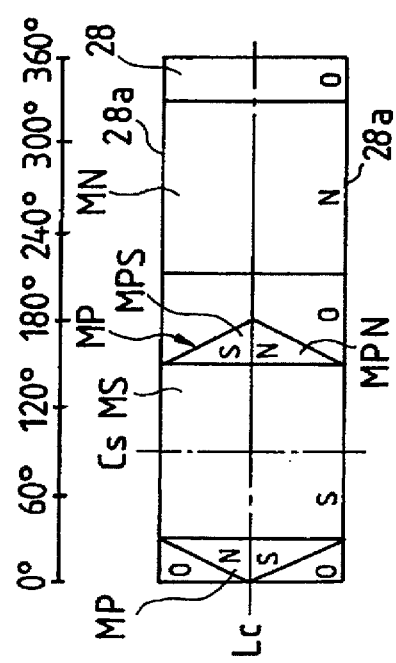

The thickness of the drive magnet 28 and the length of the same as viewed in the axial direction are equal over the entire circumference of the magnet. Both end faces 28a of the drive magnet 28 extends along a plane oriented at a right angle to the axial line. The gap between the rotor core 25 and the drive magnet 28 is substantially uniform over the entire circumference. The drive magnet 28 does not include a hole, cut-out, indentation, protruded part, or the like. FIG. 3(a) is a development diagram showing the surface of the drive magnet 28, which faces the rotor core 25. In the figure, N and S indicate the magnetized portions of the N and S poles. O indicates a nonmagnetized portion, and Lc indicates the magnetic center of the rotor core 25 in the thrust direction. In the drive magnet 28, a main magnetic pole MS of the S pole and another main magnetic pole MN of the N pole are circumferentially disposed, both having the same width. A nonmagnetized portion O is disposed between the main magnetic poles MS and MN. Auxiliary magnetic poles MP are disposed in the nonmagnetized portions on both sides of the main magnetic pole MS. The auxiliary magnetic pole MP includes a magnetized portion MPS of the S pole and another magnetized portion MPN of the N pole. These magnetized portions MPS and MPN are disposed symmetrically with respect to the magnetic center line Lc, and nonmagnetized portions. If required, the auxiliary magnetic poles MP may be disposed on both sides of the main magnetic pole MN in lieu of the main magnetic pole MS.

In the first embodiment, a magnetic field developed by the magnetized portion MPS of the S pole cancels a magnetic field by the magnetized portion MPN of the N pole in the auxiliary magnetic pole MP. Accordingly, a magnetic flux distribution in the rotation direction is as shown in FIG. 3(b). The magnetic forces contributing to the drive of the rotor 30 that are developed from the main magnetic poles MS and MN are well balanced. The resultant motor suffers from no torque loss, little torque ripple and torque cogging, and little irregular motor speed.

Figure 5A:
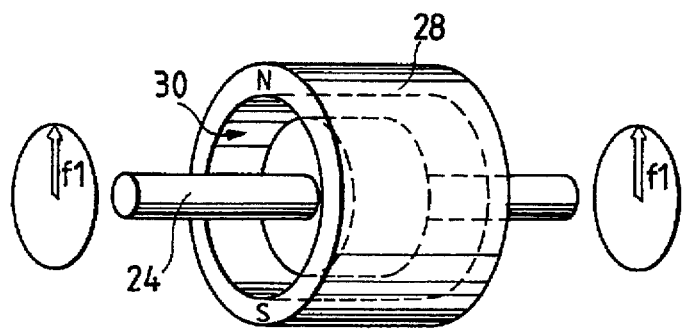
Figure 5B:
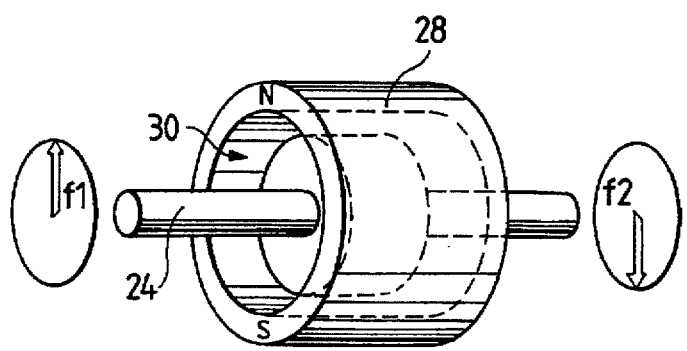
Figure 5C:
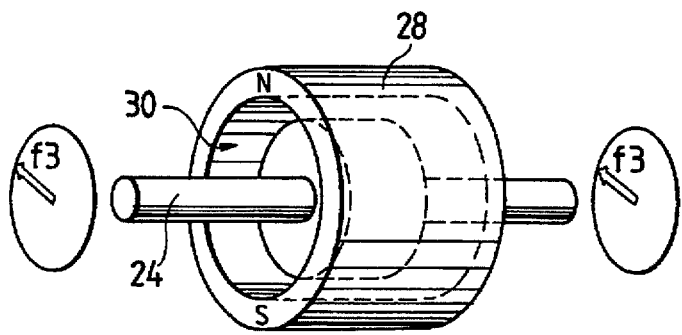
Figure 5D:
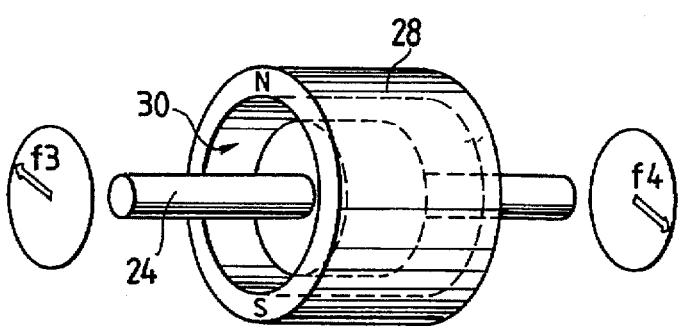

The two magnetized portions MPS and MPN of the auxiliary magnetic pole MP act to attract the rotor core 25. The patterns of the two auxiliary magnetic poles MP and MP are different when viewed in the rotation direction of the rotor. The resultant force of the attraction forces of the auxiliary magnetic poles MP and MP, which act on the rotor core 25, is denoted as f1 in FIG. 1. The resultant force biases the rotor shaft 24 in a fixed direction within the bearings. The forces radially acting on both ends of the rotor shaft 24 are both f1 as shown in FIG. 5(a). Since the attraction force f1 thus acts on the rotor shaft 24 to bias it in a fixed direction, there is eliminated a free motion of the rotor shaft 24. Hence, the rotor shaft steadily rotates generating no noise. The first embodiment of the invention successfully solves the noise and wing-turn problem inherent to the prior techniques.

Second Embodiment

A second embodiment of a small motor according to the present invention will be described with reference to FIGS. 6 through 9. The construction of the small motor of the second embodiment is the same as that of the small motor of the first embodiment except the magnetizing portions of the drive magnet 28. Accordingly, like reference numerals are used for designating like portions in the figures for the first embodiment. In FIG. 6, reference numeral 23 designates bearings; 27, a commutator; 29, a brush. As shown in FIG. 8(a), a main magnetic pole MS of the drive magnet 28 is shaped like a trapezoid. The magnetic center Ls of the main magnetic pole MS when viewed in the thrust direction is displaced from the magnetic center line Lc of the rotor core 25, in a direction. The main magnetic pole MN, disposed at a location 180° turned from the main magnetic pole MS, is also shaped like a trapezoid inverted. The magnetic center Ln of the main magnetic pole MN when viewed in the thrust direction is displaced from the magnetic center line Lc of the rotor core 25, in the direction opposite to that of the magnetic center Ls. The other portions than the main magnetic poles MS and MN are nonmagnetized portions O.

Of course, it is applicable to employing the feature that in order to reverse Ls and Ln with respect to the magnetic center line Lc as shown in FIG. 8(a), the magnetizing pattern of the main magnetic poles MS and MN are reversed, if required.

In the second embodiment under discussion, the magnetic flux is distributed as shown in FIG. 8(b). As seen from the figure, the magnetic forces contributing to the drive of the rotor are well balanced. The resultant motor suffers from no torque loss, little torque ripple and torque cogging, and little irregular motor speed. Further, as shown in FIG. 9, the force f1 acts on one end of the rotor shaft 24, while the force f2 acts on the other end. Those ends of the rotor shaft 24 are biased in fixed directions within the bearings 23 and 23. The rotor shaft 24 steadily turns free of generation of no noise and the swing-turn.

The arrangement in which the forces f1 and f2 respectively act on the ends of the rotor shaft 24 may also be realized by the constructions as shown in FIGS. 8(c), 8(e) and 8(g). In the construction of FIG. 8(c), rectangular-shaped main magnetic poles MS and MN are arrayed while being oppositely displaced with respect to the line indicative of the thrust direction. The resultant magnetic flux distribution is as shown in FIG. 8(d). In the construction of FIG. 8(e), parallelogram-shaped main magnetic poles MS and MN are arrayed while being oppositely displaced with respect to the line indicative of the thrust direction. The resultant magnetic flux distribution is as shown in FIG. 8(f). In the construction of FIG. 8(g), diamond-shaped main magnetic poles MS and MN are arrayed while being oppositely displaced with respect to the line indicative of the thrust direction. The resultant magnetic flux distribution is as shown in FIG. 8(h).

In all of those constructions, as shown in FIG. 9, the magnetic forces contributing to the drive of the rotor are well balanced. The magnetic center Ls of the main magnetic pole MS, when viewed in the thrust direction, and the magnetic center Ln of the main magnetic pole MN, disposed at a location 180° turned from the main magnetic pole MS, are oppositely displaced from the magnetic center line Lc of the rotor core 25. Therefore, the force f1 acts on one end of the rotor shaft 24, while the force f2 acts on the other end. Those ends of the rotor shaft 24 are biased in fixed directions within the bearings 23 and 23. The rotor shaft 24 steadily turns free of generation of no noise and the swing-turn.

Third Embodiment

A third embodiment of a small motor according to the present invention will be described with reference to FIGS. 10 and 11. As shown, the drive magnet 28 includes main magnetic poles MS and MN of the S and N poles, and an auxiliary magnetic pole MP placed at a position Cp turned 90° of electrical angle from the central position Cs of the main magnetic pole MS. The auxiliary magnetic pole MP includes a magnetized portion MPS of the S pole and a magnetized portion MPN of the N pole, which are disposed symmetrically with respect to the magnetic center line Lc. The remaining portions of the auxiliary magnetic pole MP are not magnetized, and denoted as O. The axial symmetric patters of the magnetized portions may be realized variously. In the case of FIG. 11(a), two triangle patterns are used for the magnetized portions MPS and MPN. The case of FIG. 11(c) uses two rectangular patterns disposed on both sides of a nonmagnetized portion O. The case of FIG. 11(e) uses triangle patterns for the magnetized portions MPS and MPN and trapezoidal patterns for the main magnetic poles MS and MN. The magnetic flux distribution profiles of those cases are illustrated in FIGS. 11(b), 11(d), and 11(f).

In the third embodiment, a magnetic field developed by the magnetized portion MPS cancels a magnetic field by the magnetized portion MPN in the auxiliary magnetic pole MP. Accordingly, the magnetic forces contributing to the drive of the rotor 30 are well balanced. An auxiliary magnetic pole is not located at a position Cq, turned 180° of rotation angle from the position Cp where the auxiliary magnetic pole MP is placed. If it is provided, the magnetic field developed therefrom is weaker than that from the auxiliary magnetic pole MP. The magnetic forces contributing to the attraction of the rotor core 25 is unbalanced. The forces f3 radially act on both ends of the rotor shaft 24, thereby to bias the rotor shaft 24 in a fixed direction within the bearings. Therefore, the useful effects as those of the first and second embodiments can be attained also in the third embodiment.

Fourth Embodiment

Figure 13B:
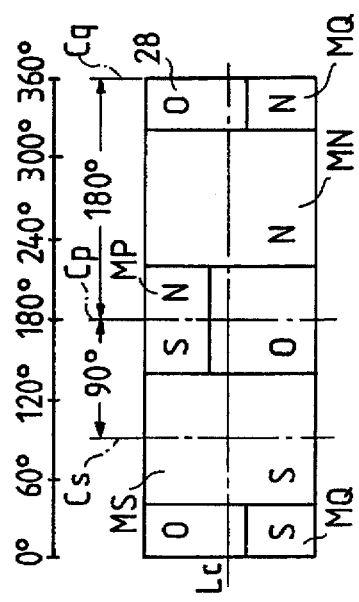

A fourth embodiment of a small motor according to the present invention will be described with reference to FIGS. 12 and 13. An auxiliary magnetic pole MP placed at a position Cp turned 90° of electrical angle from the central position Cs of the central angle of the main magnetic pole MS. Another auxiliary magnetic pole MQ placed at a position Cq turned 180° from the central position Cp. The auxiliary magnetic pole MP is deviated to one side of the rotor shaft 24 with respect to the magnetic center line Lc, while the auxiliary magnetic pole MQ is deviated to the other side. The remaining portion of each auxiliary magnetic pole denoted as O is not magnetized. The magnetic flux distribution is profiled as shown in FIG. 13(b). The auxiliary magnetic poles MP and MQ may be deviated to the locations opposite to the illustrated ones, respectively.

According to the fourth embodiment of the present invention, the magnetic forces of the portion contributing to the rotation drive of the rotor 30 are balanced. The magnetic forces contributing to the attraction of the rotor core 25 are unbalanced. The radial forces f3 and f4 act on both ends of the rotor shaft 24, thereby biasing the rotor shaft 24 in fixed directions within the bearings. The advantages similar to those achieved by the first to third embodiments can be achieved by the fourth embodiment.

Fifth Embodiment

A fifth embodiment shown in FIGS. 14 and 15 will be described. As shown in FIG. 15(a), in the drive magnet 28, a nonmagnetized portion O is located between main magnetic poles MS and MN of the S and N poles. A position turned 90° of an electric angle from the central position Cs of the main magnetic pole MS is denoted as Cp. A line PS defining the common boundary of the nonmagnetized portion and the main magnetic pole MS originates from the position Cp and extends downward to the left diverging from the vertical line containing the position Cp at an angle θ. A line PN defining the common boundary of the nonmagnetized portion and the main magnetic pole MN also originates from the position Cp and extends downward to the right diverging from the vertical line containing the position Cp. The boundary lines PS and PN are substantially axial-symmetric through the position Cp. A position 180° turned from the position Cp is denoted as Cq. A line QN defining the common boundary of the nonmagnetized portion and the main magnetic pole MN originates from the position Cq and extends upward to the left diverging from the vertical line containing the position Cq at an angle θ'. A line QS defining the common boundary of the nonmagnetized portion and the main magnetic pole MS extends downward to the left in parallel with the boundary line QS. The boundary lines QS and QN are substantially axial-symmetric. The angles θ and θ' defining the boundary lines are:

$$|θ+θ'|=180° \text{ and } 0<θ<90°.$$

Figure 14C:
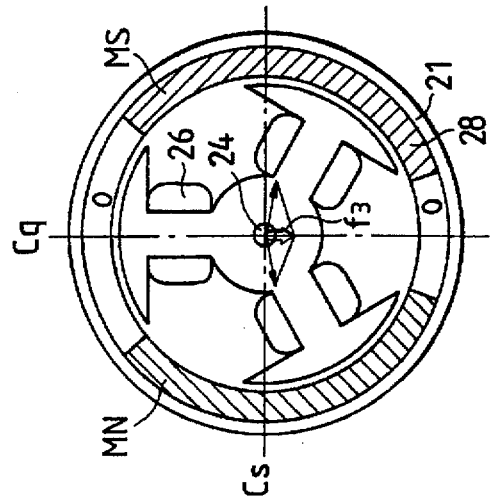
Figure 14B:
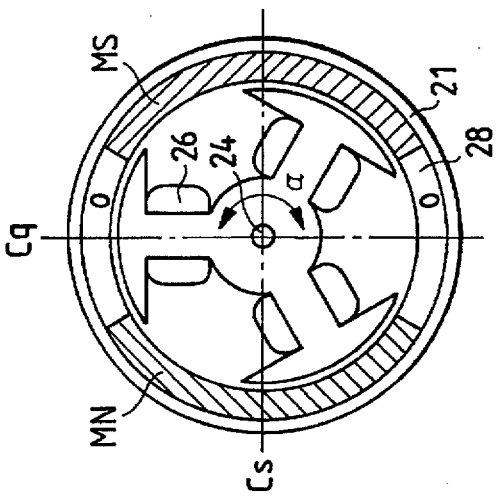
Figure 14A:
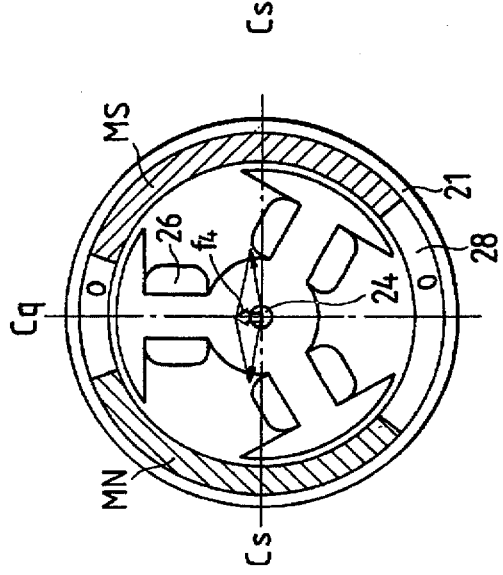

The magnetic flux density distribution of the drive magnet 28 is as shown in FIG. 15(b). The magnetic forces contributing to the drive of the rotor 30 are balanced. The radial attraction forces f4 and f3 as shown in FIGS. 14(a) and 14(c) act on the ends of the rotor shaft 24, respectively, thereby to bias the rotor shaft 24 in a fixed direction within the bearings. Therefore, the useful effects as those of the previous embodiments can be attained also in the fourth embodiment.

Sixth Embodiment

A sixth embodiment of the present invention will be described with reference to FIGS. 16(a) and (b). A position turned 90° from the central position Cs of the central angle of the main magnetic pole MS is denoted as Cp. A position turned 180° from the central position Cp is denoted as Cq. The magnetic central positions (as viewed in the thrust direction) of the portions of the main magnetic poles MS and MN closer to the position Cp are denoted as LPS and LPN, respectively. The magnetic central positions of the portions of the main magnetic poles closer to the position Cq are denoted as LQS and LQN, respectively. The main magnetic poles MS and MN are each shaped like a parallelogram and are disposed in a state that these poles are symmetrical with respect to the vertical line (extending in the axial direction) including the position Cp. The magnetic central positions LPS and LPN are located on one side of the rotor shaft 24 with respect to the magnetic center line Lc of the rotor core, while the magnetic central positions LQS and LQN are located on the other side. The magnetic center lines LPS and LPN, and LQS and LQN may be oppositely displaced from the magnetic center line Lc of the rotor core. Therefore, the useful effects as those of the first to fifth embodiments can be attained also in the sixth embodiment.

In the first to sixth embodiments thus far described, one main magnetic pole MS of the S pole and one main magnetic pole MN of the N pole are paired. It is evident that the present invention is applicable for a small motor having a P number of main magnetic poles MS (where P is a natural number) and the same number of main magnetic poles MN, totally 2P number of main magnetic poles. Several examples of magnets where P=2 are illustrated in FIGS. 17(a) to (j). The magnet shown in FIG. 17(a) corresponds to the FIG. 8(a) magnetic, and its magnetic flux density distribution is shown in FIG. 17(b). The 17(c) and 17(e) magnets correspond to the FIG. 11 magnet construction, and its magnetic flux density distributions are shown in FIGS. 17(d) and 17(f). The 17(g) magnet corresponds to the FIG. 15 magnet, and its magnetic flux density distribution is shown in FIG. 17(h). The 17(i) magnet corresponds to the magnet shown in FIGS. 1 to 3, and its magnetic flux density distribution is shown in FIG. 17(j). The small motors having those magnets assembled therein operate like those of the first to sixth embodiments, and have useful effects as those embodiments.

The nonmagnetized portion between the main magnetic poles of the magnet may be replaced by a cut-out portion. This example is illustrated in FIGS. 18(a), (b) 19 and 20. A drive magnet 38, shaped like C, includes a cut-out portion 39. The drive magnet includes a nonmagnetized portion O between the main magnetic poles MS and MN, in addition to the cut-out portion 39. Auxiliary magnetic poles MP are further formed in the nonmagnetized portion O. With such a construction, the rotor shaft is biased in a fixed direction within the bearing.

As seen from the graphs showing the magnetic flux density distributions, the magnetic flux density distribution profiles are symmetrical with respect to a point R. As shown in FIG. 7(b) and FIG. 14(b), the central angle α between the effective magnetic centers of the adjacent main magnetic pole when seen in the radial direction is nearly equal to 360°/number of magnetic poles, $$α=360°/2P \text{ (P: natural number)}$$

The boundary of the magnetic pole and the nonmagnetized portion, which is a line in the above-mentioned embodiments, may be a series of short lines or a curve. To form the magnetized portion, a nonsaturated magnetization of a sinusoidal waveshaped distribution of the magnetization intensity may be employed in lieu of the saturated magnetization. The means to bias the rotor shaft within the bearings in fixed directions may be properly combined for the same purpose.

As described above, a magnetization pattern of the magnet disposed facing the rotor core is so shaped that the magnetic forces contributing to the rotation drive of the rotor are balanced. The resultant motor suffers from less torque loss, little cogging torque, little torque ripple, and less motor speed irregularity. Further, the magnetization pattern is so shaped that the magnetic forces contributing to the rotor core attraction are unbalanced, thereby biasing the rotor shaft in fixed directions within the bearings. There is eliminated a play of the rotor shaft. Accordingly, the motor shaft steadily rotates without generating noise and the swing turn.

Further embodiments of a small motor according to the present invention will be described. The small motors to be described are each capable of controlling to a minimum a vibration of the rotor in the axial direction when the rotor rotates and improving the torque of the motor.

Like reference numerals characters used for the description of the above-mentioned embodiments will be used for designating like or equivalent portions in the figures used for the description of the embodiments to follow.

Seventh Embodiment

In the seventh embodiment shown in FIGS. 21 and 22(a)–(c), an end plate 22 is fastened to an open end of a cup-shaped motor case 21. Sintered oil-contained bearings 23 and 23 are press fit into the tubular portion and the concavity respectively located at the central part of the bottom of the motor case 21 and the center of the end plate 22. A rotor shaft 24 is rotatably supported by the couple of bearings 23 and 23. The center hole of a rotor core 25 is fit to the rotor shaft 24 within the motor case 1. The rotor core 25 is provided with a proper number (three in the instance of the seventh embodiment) of protrusion poles each having a drive coil 26 put thereon. The rotor shaft 24, the rotor core 25, and the drive coil 26 cooperate to form a rotor 30.

A ring-shaped drive magnet 28 is fastened on the inner surface of the motor case 21. The motor case 21, the bearings 23 and 23, and the drive magnet 28 make up a stator 32. The inner surface of the drive magnet 28 confronts with the outer surface of a rotor core 25, with a gap therebetween.

Current is fed to the drive coil 26 by way of a commutator 27 and a brush 29, both assembled for the rotor shaft 24. With an angular position of the rotor 30, the current is switched to cause a continuous turn of the rotor 30. One end of the rotor shaft 24 is received and supported by a thrust bearing 31.

The thickness of the drive magnet 28 and the length of the same as viewed in the axial direction are equal over the entire circumference of the magnet. Both end faces 28a of the drive magnet 28 extends along a plane oriented at a right angle to the axial line. The gap between the rotor core 25 and the drive magnet 28 is substantially uniform over the entire circumference. The drive magnet 28 is tapered not including any special shape, such as a stepped part.

Figure 22C:
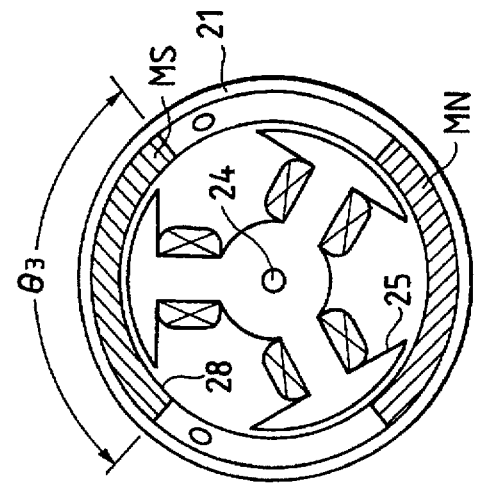
Figure 22B:
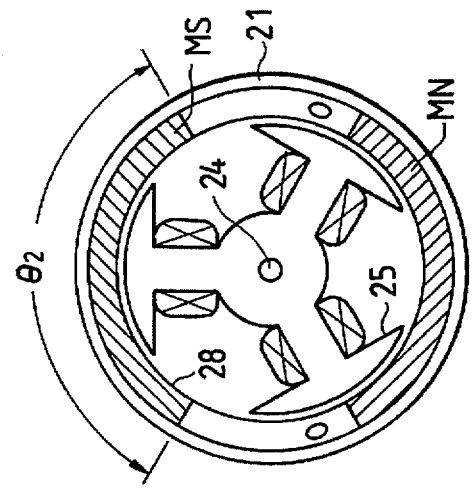
Figure 22A:
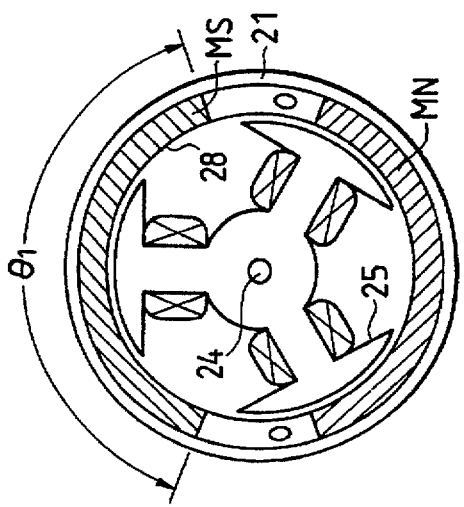
Figure 23A:
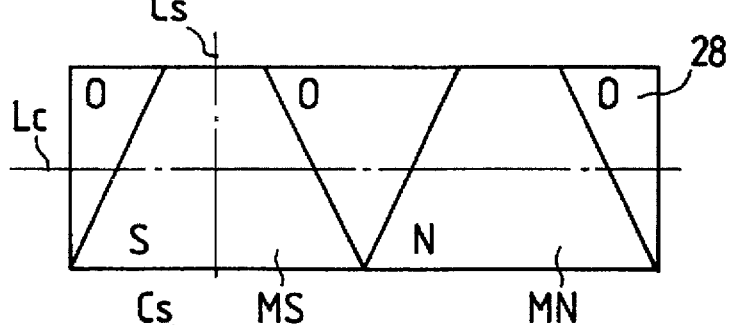

FIG. 22(a) is a cross sectional view taken on line C—C in FIG. 21 showing the small motor. FIG. 22(b) is a cross sectional view taken on line D—D in FIG. 21. FIG. 22(c) is a cross sectional view taken on line E—E in FIG. 21. FIG. 23(a) is a development diagram showing the surface of the drive magnet 28, which faces the rotor core 25. In FIG. 23(a), N represents a magnetized portion of the N pole; S, a magnetized portion of the S pole; O, a nonmagnetized portion; and Lc, a magnetic central position of the rotor core 25 when seen in the thrust direction. The drive magnet 28 includes a main magnetic pole MS of the S pole, a main magnetic pole MN of the N pole, and triangular nonmagnetized portions O each between the main magnetic poles MS and MN. The center of the axial length of the rotor core 25 is substantially coincident with that of the axial length of the drive magnet 28.

In the seventh embodiment, as shown in FIG. 23(a), the main magnetic poles MS and MN are each shaped like a trapezoid. Referring to FIGS. 22(a) to 22(c), the central angle of the main magnetic pole MS is denoted as θ1 in the cross section (FIG. 22(a)) taken on line C—C, closer to the thrust bearing 31 than to the magnetic central position Lc of the rotor core 25. The central angle of the main magnetic pole MS is denoted as θ3 in the cross section (FIG. 22(c)) taken on line E—E. Here, θ1>θ3. The same thing is correspondingly applied to the main magnetic pole MN.

In the seventh embodiment, the attraction force from the end (illustrated in FIG. 22(a)) of each of the main magnetic poles MS and MN that acts on the rotor core 25, is stronger than that from the end of each main magnetic pole, illustrated in FIG. 22(c). As the result of the unbalance of the magnetic forces, the rotor core 25 is moved in the axial direction (upward in FIG. 21). The rotor 30 is constantly pushed against the thrust bearing 31.

The seventh embodiment is arranged so as to satisfy the following formula $$θ2≈\{(B-C)/(A×B)\}×360°$$

where θ2: central angle of the main magnetic pole MS at the magnetic center as viewed in the thrust direction (FIG. 22(b))

A: number of the main magnetic poles of the small motor

B: number of protrusion poles of the rotor core

Figure 23B:
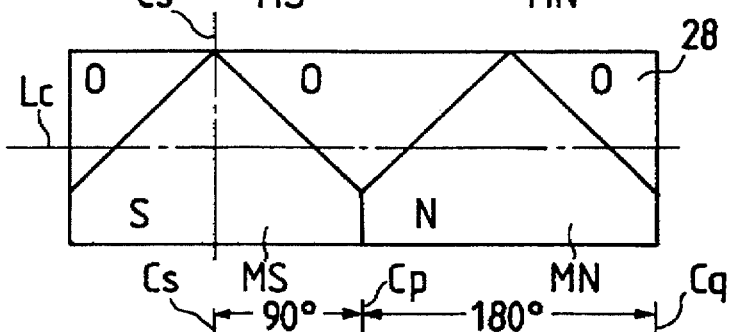
Figure 23C:
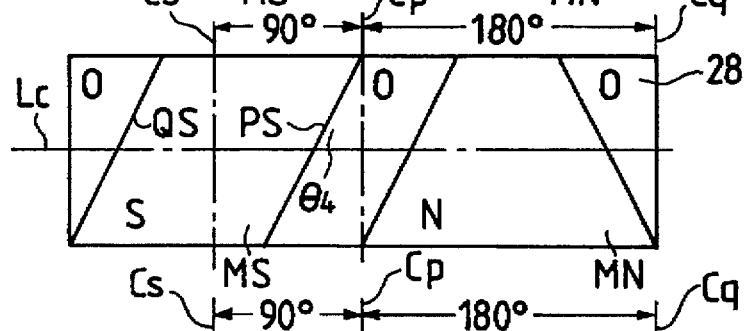
Figure 23D:
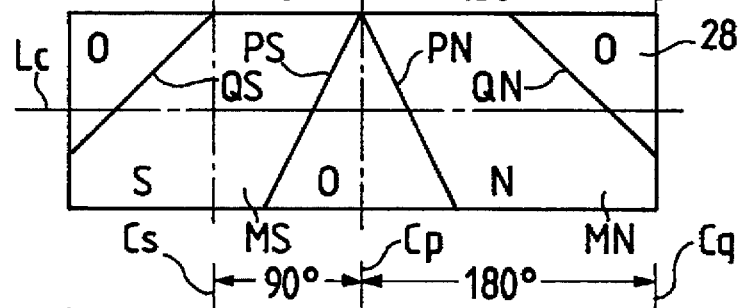
Figure 23E:
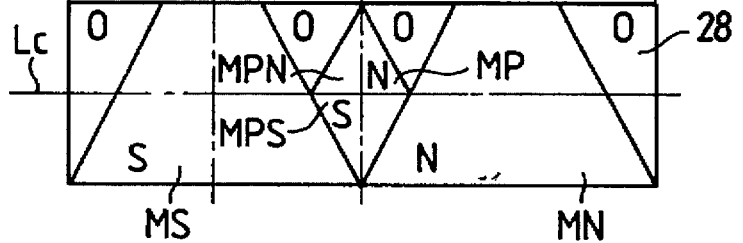
Figure 23F:
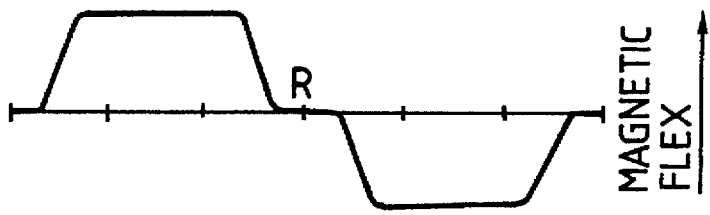
Figure 23G:
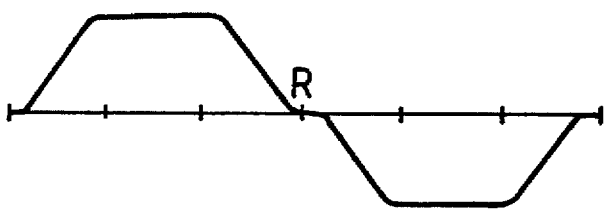
Figure 23H:
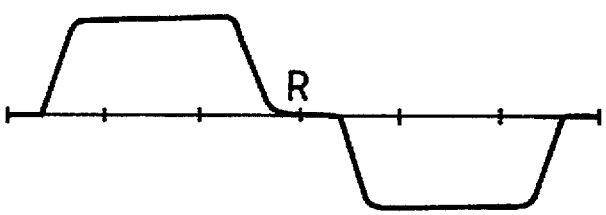
Figure 23I:
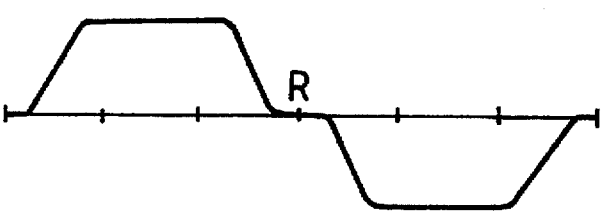

C: greatest common measure of A and B.

Where the above formula is satisfied, a magnetic flux density of the drive magnet 28 is profiled along the magnetic central line Lc of the rotor core 25, as shown in FIG. 23(f). As seen, the magnetic forces contributing to the rotation of the rotor 30 are well balanced. Therefore, a small motor of less torque loss, and little cogging torque and torque ripple, and smooth rotation is realized. θ2 is within a tolerance ±10°. There is no need of satisfying the above formula, θ2≈{(B-C)/(A×B)}×360°.

Eighth Embodiment

The eighth embodiment of the present invention will be described. FIG. 23(b) is a development diagram showing the surface of the drive magnet 28, which faces the rotor core 25, according to the eighth embodiment of the present invention.

In FIG. 23(b), the main magnetic poles MS and MN are each shaped like a pentagon. Nonmagnetized portions O are each formed between the main magnetic poles MS and MN. The central angle of the main magnetic pole MS is denoted as θ1 in the cross section closer to the thrust bearing than to the magnetic center Lc of the rotor core 25. The central angle of the main magnetic pole MS is denoted as 83 in the cross section of the other end. Here, θ1>θ3. The same thing is correspondingly applied to the main magnetic pole MN.

Also in the eighth embodiment, the attraction force from the end (closer to the thrust bearing, the lower side in FIG. 23(b)) of each of the main magnetic poles MS and MN that acts on the rotor core 25, is stronger than that from the end (the upper side in FIG. 23(b)) of each main magnetic pole. As the result of the unbalance of the magnetic forces, the rotor core 25 is moved in the axial direction (upward in FIG. 21). The rotor 30 is constantly pushed against the thrust bearing 31, thereby controlling a vibration of the rotor in the axial direction when it rotates.

Ninth Embodiment

The ninth embodiment of the present invention will be described. FIG. 23(c) is a development diagram showing the surface of the drive magnet 28, which faces the rotor core 25, according to the ninth embodiment of the present invention.

As shown in FIG. 23(c), the main magnetic pole MN is shaped like a trapezoid, while the main magnetic pole MS is shaped like a parallelogram. Nonmagnetized portions O, shaped like a parallelogram and a trapezoid, are located each between the main magnetic poles MS and MN.

In the drive magnet thus constructed, the attraction forces by the main magnetic pole MS are balanced, but the attraction forces by the main magnetic pole MN for the rotor core 25 are unbalanced. As a result, an attraction force acts on the rotor core 25 in the axial direction. The rotor 30 is constantly pushed against the thrust bearing 31, thereby controlling a vibration of the rotor in the axial direction when it rotates. If required, the main magnetic pole MS may be shaped like a trapezoid, while the main magnetic pole MN, shaped like a parallelogram. It is essential to vary the central angle of one of the main magnetic poles in the axial direction.

In the ninth embodiment, an axially extending line containing the central position of the main magnetic pole MS is denoted as Cs. An axially extending line passing a position turned by 90° of an electrical angle from the line Cs is denoted as Cp. An axially extending line passing a position turned by 180° from the line Cp is dented as Cq. The line Cp longitudinally divides the parallelogram nonmagnetized portion. A common boundary between the parallelogram nonmagnetized portion and the main magnetic pole MS is denoted as PS. The boundary line PS is slanted at an angle θ4 with respect to the line Cp. A common boundary between the triangular nonmagnetized portion and the main magnetic pole MN is denoted as QS. The boundary line QS is parallel to the boundary line PS, but slanted at an angle θ4 with respect to the line Cp. In the drive magnet thus constructed, an attraction force by which the drive magnet 28 attracts the rotor core 25 in the radial direction is strong at the position of the line Cp in the upper portion of FIG. 23(c), and the magnetic force is weak at the position of the line Cq. In the lower portion of FIG. 23(c), the magnetic force is weak at the position of the line Cp and strong at the position of the line Cq. The magnetic forces contributing to the attraction forces acting on the rotor core 25 are thus unbalanced. Accordingly, the rotor shaft 24 is biased in fixed directions within the bearings 23 and 23. As a result, there is solved such a problem of the conventional small motor that because of the clearance present between the rotor shaft and the bearings, the rotor shaft vibrates within the bearings to generate noise, and turns while being swung.

Tenth Embodiment

FIG. 23(d) is a development diagram showing the surface of the drive magnet 28, which faces the rotor core 25, according to the tenth embodiment of the present invention.

In FIG. 23(d), the main magnetic poles MS and MN are each shaped like a trapezoid. The boundary lines QN and PN, and QS and PS are slanted at different angles to a line Cp (axially extends passing through a position turned 90° of electrical angle from a line Cs which axially extends passing through the center (when circumferentially viewed) of the main magnetic pole MS on the line of the magnetic central position Lc). As shown in FIG. 23(d), the bottom width of each of the main magnetic poles MS and MN is wider than the top width. Triangular nonmagnetized portions O are each located between the main magnetic poles MS and MN.

In the construction of this embodiment, the central angle of each main magnetic pole is varied in the axial direction. Therefore, the rotor core 25 develops an attraction force in the axial direction. The rotor 30 is constantly pushed against the thrust bearing 31, thereby preventing a vibration of the rotor in the axial direction when it turns. The magnetic forces to attract the rotor core 25 in the radial direction are unbalanced. The rotor shaft 24 is biased in fixed direction within the bearings 23 and 23, as in the ninth embodiment. The vibration of the rotor 30 and the rotor shaft 24 in the radial direction as well as the vibration of them in the axial direction is prevented.

Eleventh Embodiment

FIG. 23(e) is a development diagram showing the surface of the drive magnet 28, which faces the rotor core 25, according to the eleventh embodiment of the present invention.

Figure 23J:
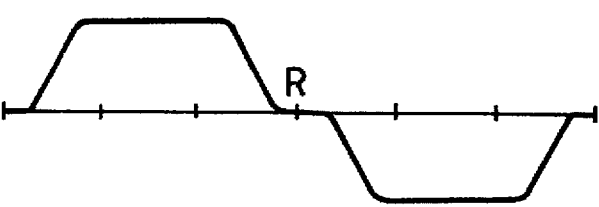

As shown in FIG. 23(e), the drive magnet 28 includes main magnetic poles MS and MN. A diamond-shaped auxiliary magnetic pole MP is provided along a line Cp turned 90° of electrical angle from a line Cs passing through the central position (as circumferentially viewed) of the main magnetic pole MS. The auxiliary magnetic pole MP includes a magnetized portion MPS of the S pole and another magnetized portion MPN of the N pole. The magnetized portions MPS and MPN are symmetrical with respect to the line of the magnetic central position Lc. The shape of the main magnetic poles MS and MN is the same as that of the main magnetic poles in the seventh embodiment. These main magnetic poles generate attraction forces in the axial direction as in the seventh embodiment. The remaining portions are not magnetized. In the eleventh embodiment, the magnetic force from the auxiliary magnetized portion MPS interacts with that from the auxiliary magnetized portion MPN to be neutralized. Only the magnetic forces from the main magnetic poles MS and MN act on the rotor core 25, forming a profile of magnetic flux density distribution as shown in FIG. 23(j). As a result, the magnetic force acting on the upper part of the shaft is different from that acting on the lower part. This causes an attraction force in the axial direction. The rotor 30 is constantly pushed against the thrust bearing 31, thereby preventing the vibration of the rotor in the axial direction when it turns.

In the eleventh embodiment, the magnetic force of the auxiliary magnetic pole MP acts as an attraction force on the rotor core 25. Accordingly, the force f3 radially acts on the rotor 30 as shown in FIG. 24, thereby biasing the rotor shaft 24 in a fixed direction. This embodiment can prevent the rotor 30 and the rotor shaft 24 from vibrating in the axial and radial directions. The magnetized portions MPS and MPN, shaped like a triangle, may take a rectangular or polygonal shape. A plurality of auxiliary magnetic poles MP consisting of the magnetized portions MPS and MPN may be provided.

The profiles of the magnetic flux density distributions of the above-mentioned embodiments are each substantially symmetrical with respect to a point R, as shown in FIGS. 23(f) to 23(j). The central angle α between the effective magnetic centers of the adjacent main magnetic pole when seen in the radial direction is nearly equal to 360°/number of magnetic poles, $$\alpha = 360°/2P \text{ (P: natural number)}$$

In the seventh to eleventh embodiments thus far described, one main magnetic pole MS of the S pole and one main magnetic pole MN of the N pole are paired. It is evident that the present invention is applicable for a small motor having a P number of main magnetic poles MS (where P is a natural number) and the same number of main magnetic poles MN, totally 2P number of main magnetic poles.

The nonmagnetized portion between the main magnetic poles of the magnet may be replaced by a cut-out portion. The polarities of the magnetized portions of the above-mentioned embodiments may be exchanged with each other; S pole to N pole and vice versa.

In the above-mentioned embodiments, the rotor shaft is supported at one end by the thrust bearing. If required, a radial bearing may be used in lieu of the thrust bearing. In this case, it supports the end face of the rotor or a stepped part that is formed in the rotor shaft.

The eighth to eleventh embodiments, like the seventh embodiment, may be arranged so as to satisfy the following formula $$\theta 2 = \{(B-C)/(A \times B)\} \times 360°$$

where θ2: central angle of the main magnetic pole MS at the magnetic center as viewed in the thrust direction (FIG. 22(b))

A: number of the main magnetic poles of the small motor
B: number of protrusion poles of the rotor core
C: greatest common measure of A and B.

Where the above formula is satisfied, a magnetic flux density of the drive magnet 28 is profiled along the magnetic central line Lc of the rotor core 25, as shown in FIGS. 23(g) to 23(j). As seen, the magnetic forces contributing to the rotation of the rotor 30 are well balanced. Therefore, a small motor of less torque loss, and little cogging torque and torque ripple, and smooth rotation is realized. θ2 is within tolerance±10°. There is no need of satisfying the above formula, θ2≈{(B–C)/(A×B)}×360°.

The boundary of the adjacent magnetic poles or the magnetic pole and the nonmagnetized portion, which is a line in the above-mentioned embodiments, may be a series of short lines or a curve. To form the magnetized portion, a nonsaturated magnetization of a sinusoidal waveshaped distribution of the magnetization intensity may be employed in lieu of the saturated magnetization. The means to bias the rotor shaft within the bearings in fixed directions may be properly combined for the same purpose.

Another embodiment of a small motor according to the present invention will be described with reference to FIG. 25. In the embodiment, the present invention is applied to a brushless motor in which the magnet is mounted to the rotor, and the core facing the magnet is mounted to the stator.

In FIG. 25, a stator core 36 is located above a substrate board 33 in a state that a spacer 35 is located between them. A sintered oil-contained bearing 34 is fit into the central holes of the spacer 35 and the stator core 36. The assembly of the bearing 34, the spacer 35, and the stator core 36 is fastened to the substrate board 33 by means of a screw 44. The stator core 36 is provided with a proper number of protrusion poles each having a drive coil 37 put thereon.

A thrust bearing 42 is mounted on the bottom surface of the bearing 34. The bearing 34 and the thrust bearing 42 form a bearing assembly. The bearing assembly rotatably supports a rotor shaft 38. The bearing assembly, the stator core 36, and the like cooperate to form a stator 40.

A rotor case 39, shaped like an inverted cup, is fit to one end of the rotor shaft 38, thereby forming one-piece construction. A ring-like drive magnet 43 is fastened to the inner surface of the rotor case 39. The inner surface of the drive magnet 43 confronts with the outer surface of the stator core 36 in a state that a proper clearance is present therebetween. The rotor shaft 38, the rotor case 39, the drive magnet 43, and the like make up a rotor 41.

A magnetization pattern of the inner surface of the drive magnet 43 takes one of the magnetization patterns of the seventh to eleventh embodiments. With the magnetization pattern, the brushless motor of the embodiment can achieve the useful effects comparable with those of the seventh to eleventh embodiments.

In the conventional small motor, the magnet is entirely magnetized. Because of this, the attraction force in the thrust direction (downward in FIG. 25) is excessively strong, reducing the lifetime of the thrust bearing. Use of the nonmagnetized portion as in the embodiments weakens the attraction force in the thrust direction, thereby elongating the lifetime of the thrust bearing and the motor per se.

The present invention is applicable for a small motor of the shaft-fixed type in which the rotor revolves about a fixed axis.

A small motor having a bearing, a rotor shaft rotatably supported by the bearing, a rotor rotating facing the stator, one of the rotor and the stator consisting of a core with a winding put thereon, and the other consisting of a magnet, wherein the magnet is so constructed that the magnetic forces contributing to the core attraction in the radial direction are unbalanced, thereby biasing the rotor shaft in fixed directions within the bearings. With such a construction, the magnetic unbalance as viewed in the thrust direction causes an attraction force acting in the axial direction, which pushes the rotor in the thrust direction. As a result, a vibration of the rotor in the axial direction is eliminated. The magnet and the core are not deformed in any form for obtaining the attraction force in the axial direction. This feature neither increases the part cost nor decreases the motor torque. The vibration of the rotor in the axial direction is controlled by using a unique magnetization pattern of one magnet. With this feature, a small motor can be realized without increasing the number of parts and the cost to manufacture.

Additionally, the vibration of the rotor in the axial direction can be controlled to a minimum without increasing the axial length of the small motor when compared with a case where the rotor is pushed in the axial direction by an attraction force acting in the axial direction that is caused by deviating the center of the axial length of the core from that of the axial length of the magnet.

Further, the magnetic forces to attract the core in the radial direction are unbalanced to bias the rotor shaft in fixed direction within the bearing. This feature eliminates the vibration of the rotor shaft within the bearing, and the swing turn of the rotor shaft.

Additionally, the magnetization pattern of the magnet facing the core is shaped so as to balance the magnetic forces contributing to the rotation drive of the rotor. Therefore, the torque loss, cogging torque and torque ripple are minimized, ensuring a smooth turn of the motor. The irregular motor speed is also removed.

What is claimed is:

1. A small motor comprising:
   a rotor fastened to a rotor shaft;
   a drive magnet disposed facing to the rotor; and
   bearings for rotatably supporting the rotor shaft with the rotor fastened thereto,
   wherein a magnetization pattern of the magnet is shaped in such a manner that magnetic forces contributing to rotation drive of the rotor are balanced, and magnetic forces contributing to rotor core attraction are unbalanced, thereby biasing the rotor shaft in fixed directions within the bearings, wherein
   the magnetization pattern of the drive magnet includes magnetized portions of S and N poles, nonmagnetized portions, and auxiliary magnetized portions for developing the magnetic forces contributing to the rotor core attraction, and wherein the auxiliary magnetized portions are unbalanced in a direction of rotor rotation.

2. The small motor as claimed in claim 1, wherein the rotor has a plurality of salient poles having a drive coil set thereon.

3. The small motor as claimed in claim 1, wherein the rotor shaft is rotatably supported at respective ends by the bearings.

4. The small motor as claimed in claim 1, wherein the magnetic forces contributing to the rotor core attraction are unbalanced in a direction of rotor rotation.

5. The small motor as claimed in claim 1, wherein the magnetization pattern of the drive magnet includes magnetized portions of S and N poles, nonmagnetized portions, and auxiliary magnetized portions for developing the magnetic forces contributing to the rotor core attraction, and wherein the auxiliary magnetized portions are unbalanced in a direction of rotor rotation.

6. The small motor as claimed in claim 1, wherein the magnetized portions of S and N poles are shifted from each other by an angle of 180°, and magnetic central positions of the magnetized portions of said S and N poles in a thrust direction are oppositely shifted with respect to a magnetic central line of the rotor core.

7. The small motor as claimed in claim 1, wherein the auxiliary magnetized portions are separated by 90° of an electrical angle from either of the magnetized portions of the S and N poles.

8. A small motor comprising:

a shaft;

a stator;

a rotor rotatably confronted to the stator; and bearings for rotatably supporting the shaft, wherein one of the rotor and the stator comprises a core having wire windings and the other comprises a magnet, wherein a central angle of a main magnetic pole at a magnetic center of the magnet as viewed in an axial direction of the core is a predetermined value, and wherein the central angle is different on opposite sides of the magnetic center in the axial direction.

9. The small motor as claimed in claim 8, wherein a magnetization pattern of the magnet facing the core is shaped so that magnetic forces contributing to core attraction in a radial direction are unbalanced, thereby biasing the rotor shaft in fixed directions within the bearings.

10. The small motor as claimed in claim 8, wherein a magnetization pattern of the magnet facing the core is shaped so that magnetic forces contributing to rotation drive of the rotor are balanced.

11. The small motor as claimed in claim 9, wherein the magnetization pattern of the magnet disposed facing the core is shaped so that magnetic forces contributing to rotation drive of the rotor are balanced.

12. The small motor as claimed in claim 8, wherein the central angle at the magnetic center is expressed by $$\theta = \{([b]\underline{B} - C)/(A \times B)\} \times 360°$$

where

A: number of main magnetic poles of the magnet;

B: number of protrusion poles of the core; and

C: greatest common measure of A and B with tolerance ±10°.

13. The small motor as claimed in claim 8, wherein a magnetization pattern of the magnet includes magnetized portions of S and N poles, nonmagnetized portions, and auxiliary magnetized portions for developing magnetic forces contributing to rotor core attraction, and wherein the auxiliary magnetized portions are unbalanced in a direction of rotor rotation.

14. The small motor as claimed in claim 8, wherein a magnetization pattern of the magnet includes magnetized portions of S and N poles and nonmagnetized portions, and wherein the magnetized portions of S and N poles are shifted from each other by an angle of 180°, and magnetic central positions of the magnetized portions in the axial direction of the core are oppositely shifted with respect to the magnetic center of the magnet in the axial direction of the core.

15. The small motor as claimed in claim 13, wherein the auxiliary magnetized portions are separated by 90° of an electrical angle from either of the magnetized portions of the S and N poles.

16. A small motor as recited in claim 1, wherein the rotor shaft is biased in a direction transverse to a longitudinal axis of the rotor shaft.

17. A small motor as recited in claim 1, wherein the magnetic forces contributing to rotor core attraction act on both ends of the rotor shaft in either the same direction or opposite directions.

18. A small motor as recited in claim 8, wherein the shaft is biased in a direction transverse to a longitudinal axis of the shaft.

19. A small motor as recited in claim 8, wherein magnetic forces contributing to rotor core attraction act on both ends of the shaft in either the same direction or opposite directions.

* * * * *